(12) United States Patent
Norton et al.

(10) Patent No.: US 9,794,319 B2
(45) Date of Patent: *Oct. 17, 2017

(54) MODULAR TRANSCODING PIPELINE

(71) Applicant: VANTRIX CORPORATION, Montreal (CA)

(72) Inventors: Richard Elliott Norton, Ste-Genevieve (CA); Mario Joseph Leo Claude Lavalliere, Mascouche (CA); Louis-Rene Poirier-Beauchemin, Montreal (CA)

(73) Assignee: VANTRIX CORPORATION, Montreal (CA)

( * ) Notice: Subject to any disclaimer, the term of this patent is extended or adjusted under 35 U.S.C. 154(b) by 270 days.

This patent is subject to a terminal disclaimer.

(21) Appl. No.: 13/655,384

(22) Filed: Oct. 18, 2012

(65) Prior Publication Data

US 2013/0042022 A1 Feb. 14, 2013

Related U.S. Application Data

(63) Continuation of application No. 12/334,452, filed on Dec. 13, 2008, now Pat. No. 8,311,058, which is a (Continued)

(51) Int. Cl.
*H04W 4/12* (2009.01)
*G06F 7/00* (2006.01)
*H04L 29/06* (2006.01)

(52) U.S. Cl.
CPC ........ *H04L 65/605* (2013.01); *H04L 65/1023* (2013.01)

(58) Field of Classification Search
CPC .......................... H04L 65/605; H04L 65/1023
(Continued)

(56) References Cited

U.S. PATENT DOCUMENTS 5,978,370 A 11/1999 Shively
6,289,358 B1 9/2001 Mattis et al.
(Continued)

FOREIGN PATENT DOCUMENTS

CN 1859610 11/2006
CN 101184091 5/2008
(Continued)

OTHER PUBLICATIONS

Coskun, Baris, Sankur, Bulent "Robust Video Hash Extraction" article available at <citeseerx.ist.psu.edu/viewdoc/download?doi=10.1.1.113.9934.pdf> European Signal Processing Conference WUSIPCO 2004.
(Continued)

*Primary Examiner* — Luat Phung
(74) *Attorney, Agent, or Firm* — IP-MEX Inc.; Victoria Donnelly

(57) ABSTRACT

A modular transcoder software system for transcoding a multimedia message includes a collection of software modules and objects for the dynamic construction of a series of complex, related or unrelated operations in the form of a transcoding pipeline. The transcoding pipeline provides a hierarchy of operations, such that they can be organized and optimized with the aim of being able to execute the entire hierarchy in a single pass. Additionally, external plugins can customize the mechanism of building the pipeline by altering, adding to, or removing construction knowledge.

28 Claims, 12 Drawing Sheets

Related U.S. Application Data continuation-in-part of application No. 12/118,690, filed on May 10, 2008.

(60) Provisional application No. 60/971,111, filed on Sep. 10, 2007.

(58) Field of Classification Search
USPC .................. 370/466, 468, 469; 709/223, 236
See application file for complete search history.

(56) References Cited

U.S. PATENT DOCUMENTS

| | | |
|---|---|---|
| 6,470,378 B1 | 10/2002 | Tracton et al. |
| 6,483,851 B1 | 11/2002 | Neogi |
| 6,563,517 B1 | 5/2003 | Bhagwat et al. |
| 6,785,732 B1 | 8/2004 | Bates et al. |
| 6,813,690 B1 | 11/2004 | Lango |
| 6,888,477 B2 | 5/2005 | Lai et al. |
| 6,970,602 B1 | 11/2005 | Smith |
| 7,010,581 B2 | 3/2006 | Brown |
| 7,076,544 B2 | 7/2006 | Katz et al. |
| 7,409,464 B2 | 8/2008 | Jansson |
| 7,475,106 B2 | 1/2009 | Angoli |
| 7,549,052 B2 | 6/2009 | Haitsma |
| 7,577,848 B2 | 8/2009 | Schwartz |
| 7,640,274 B2 | 12/2009 | Tinker |
| 7,692,666 B1 | 4/2010 | Bourgoin et al. |
| 7,831,900 B2 | 11/2010 | Lee |
| 7,876,766 B1 * | 1/2011 | Atkins et al. .................. 370/401 |
| 7,890,619 B2 | 2/2011 | Morota et al. |
| 2001/0024386 A1 | 9/2001 | Harari |
| 2002/0103972 A1 | 8/2002 | Satran |
| 2002/0178271 A1 | 11/2002 | Graham et al. |
| 2003/0097564 A1 | 5/2003 | Tewari |
| 2004/0001106 A1 | 1/2004 | Deutscher |
| 2004/0024897 A1 | 2/2004 | Ladd et al. |
| 2004/0032348 A1 | 2/2004 | Lai et al. |
| 2004/0111476 A1 | 6/2004 | Trossen et al. |
| 2004/0181550 A1 | 9/2004 | Warsta et al. |
| 2004/0221120 A1 | 11/2004 | Abrashikevich et al. |
| 2004/0268224 A1 | 12/2004 | Balkus |
| 2005/0187756 A1 | 8/2005 | Montgomery |
| 2006/0010226 A1 | 1/2006 | Hurtta et al. |
| 2006/0029192 A1 | 2/2006 | Duddley et al. |
| 2006/0095452 A1 | 5/2006 | Jansson et al. |
| 2006/0156218 A1 | 7/2006 | Lee |
| 2006/0161538 A1 | 7/2006 | Kiilerich |
| 2006/0174300 A1 | 8/2006 | Gu et al. |
| 2006/0242550 A1 | 10/2006 | Rahman |
| 2007/0011256 A1 | 1/2007 | Klein |
| 2007/0067390 A1 | 3/2007 | Agnoli et al. |
| 2007/0150877 A1 | 6/2007 | Emmett et al. |
| 2007/0204318 A1 | 8/2007 | Ganesh |
| 2007/0216761 A1 | 9/2007 | Gronner et al. |
| 2008/0001791 A1 | 1/2008 | Wanigasekara-Mohotti et al. |
| 2008/0091840 A1 | 4/2008 | Guo et al. |
| 2008/0140720 A1 * | 6/2008 | Six et al. .................. 707/104.1 |
| 2008/0196076 A1 | 8/2008 | Shatz et al. |
| 2008/0201386 A1 * | 8/2008 | Maharajh et al. ............ 707/201 |
| 2008/0226173 A1 | 9/2008 | Yuan |
| 2008/0229429 A1 | 9/2008 | Krig |
| 2008/0270436 A1 | 10/2008 | Fineberg et al. |
| 2009/0067357 A1 | 3/2009 | Norton |
| 2009/0083279 A1 | 3/2009 | Hasek |
| 2009/0088191 A1 * | 4/2009 | Norton et al. .................. 455/466 |
| 2009/0125677 A1 | 5/2009 | Leveque |
| 2009/0193485 A1 | 7/2009 | Rieger et al. |
| 2009/0280844 A1 * | 11/2009 | Norton et al. .................. 455/466 |
| 2009/0316715 A1 | 12/2009 | Saniee |
| 2010/0094817 A1 | 4/2010 | Ben-Shaul et al. |
| 2010/0114816 A1 * | 5/2010 | Kiilerich ..................... 707/610 |
| 2010/0153495 A1 | 6/2010 | Barger |
| 2010/0195538 A1 | 8/2010 | Merkey et al. |
| 2010/0281112 A1 | 11/2010 | Plamondon |
| 2010/0318632 A1 | 12/2010 | Yoo et al. |
| 2011/0106822 A1 | 5/2011 | Golwalkar et al. |
| 2011/0131298 A1 | 6/2011 | Courtemanche |
| 2011/0161409 A1 | 6/2011 | Nair et al. |
| 2011/0264865 A1 | 10/2011 | Mobarak |
| 2012/0173907 A1 | 7/2012 | Moses |
| 2012/0323872 A1 | 12/2012 | Vasquez Lopez |
| 2013/0042022 A1 * | 2/2013 | Norton et al. ................ 709/246 |
| 2013/0046849 A1 | 2/2013 | Wolf |
| 2013/0204961 A1 | 8/2013 | Filam |

FOREIGN PATENT DOCUMENTS

| | | |
|---|---|---|
| EP | 1001582 A2 | 5/2000 |
| EP | 1460848 A2 | 9/2004 |
| EP | 1482735 | 12/2004 |
| JP | 09325413 | 12/1997 |
| JP | 2001-117809 | 4/2001 |
| JP | 2001007809 | 4/2001 |
| JP | 2002108870 | 12/2002 |
| JP | 2003143575 | 5/2003 |
| JP | 2013143575 | 5/2003 |
| JP | 2003337739 | 11/2003 |
| JP | 2004078354 | 3/2004 |
| JP | 2004-526227 | 8/2004 |
| JP | 2005-527881 | 9/2005 |
| JP | 2007053699 | 3/2007 |
| JP | 2007-158687 | 6/2007 |
| WO | 02052730 | 7/2002 |
| WO | 03040893 | 5/2003 |
| WO | WO 2004/088951 | 10/2004 |
| WO | WO2004097688 A1 | 11/2004 |
| WO | WO2006/023302 | 3/2006 |
| WO | WO 2007/032606 | 3/2007 |
| WO | 2007037726 | 4/2007 |
| WO | WO2007037726 A1 | 4/2007 |
| WO | WO 2007/060521 | 5/2007 |
| WO | WO 2007/075201 | 7/2007 |
| WO | WO2012-088023 A2 | 6/2012 |

OTHER PUBLICATIONS

Relational Database System (RDBS), available from http://www.mysql.org/ published by Sun Microsystems, available prior to Nov. 12, 2007.

Request for Comments (RFC)1321 "The MD5 Message-Digest Algorithm", R. Revest, available from http://tools.ietf.org/html/rfc1321 published by IEFT (Internet Engineering Task Force) Apr. 1992.

MM1, MM3, MM4, MM7 are defined by the 3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip).

"Internet Content Adaptation Protocol (ICAP)" J. Elson, Request for Comments (RFC) 3597 available from http://www.ietf.org/rfc/rfc3507.txt, Apr. 2003.

JPEG—Wikipedia, the free encyclopedia, http://en.wikipedia.org/wiki/JPEG, Aug. 5, 2007.

Advanced Audio Coding—Wikipedia, the free encyclopedia, http://en.wikipedia.org/wiki/Advanced_Audio_Coding, Aug. 5, 2010.

Multimedia Messaging Service, Media formats and codecs 3GPP TS 26.140, V 7.1.0, http:// www.3gpp.org/ftp/specs/html-info/26140.htm, Jun. 2007.

Synchronized Media Integration Language (SMIL) 2.0 Specification W3C Recommendation Aug. 7, 2001, http://www.w3.org/TR/smil20/, Aug. 7, 2001.

"The independent JPEG Group" ftp.uu.net/graphics/jpeg/jpegsrc.v6b.tar.gz, Aug. 3, 2007.

"Multimedia Adaptation for the Multimedia Messaging Service" Stephane Coulombe and Guido Grassel, IEEE Communication Magazine, vol. 42, No. 7, p. 120-126, Jul. 2004.

OMA Multimedia Messaging Service, Architecture Overview, Approved Version 1.2 01, published by Open Mobile Alliance,

(56) References Cited

OTHER PUBLICATIONS available from http://www.openmobilealliance.org/release_program/mms_v1_2.html, Mar. 2005.
Open Mobile Alliance document OMA-AD-STI-V10-20070515-A "Architecture of the Environment using the Standard Transcoding Interface" Approved Version 1.0—May 15, 2007, published by Open Mobile Alliance.
3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip).
Synchronized Multimedia Integration Language (SMIL) 1.0 Specification, published by W3C organization at http://www.w3.org/TR/REC-smil Jun. 15, 1998.
Nokia Multimedia Messaging Service Center, External Application Interface, Frequently Asked Questions, Reference for External Application Interface (EAIF) protocol available at http://www.forum.nokia.com/info/sw.nokia.com/id/d0ee4125-3879-4482-b55d-90e3afe17a31/Ext_App_Interface_FAQ.pdf.html published by Nokia, prior to Sep. 9, 2007.
Tayeb Lemlouma, Nabil Layaida "Encoding Multimedia Presentations for User Preferences and Limited Environments" Proceedings of IEEE International Conference on Maultimedia & Expo (ICME), IEEE Computer Society, p. 165-168.,2003.
International Search Report and Written Opinion rendered by Canadian Intellectual Property Office, dated Apr. 20, 2009 for PCT/CA2008/002286.
International Search Report issued by CIPO for PCT/CA2008/002286 dated Apr. 20, 2009.
"Multimedia Adaptation for Multimedia Messaging Service" Stephane Coulombe and Guido Grassel, IEEE Communication Magazine, vol. 42, No. 7, p. 120-126, Jul. 2004.
3GPP TS 26.140 v7.1.0, Technical Specification. 3rd Generation Partnership Project; Technical Specification Gropu Services and System Aspects; Multimedia Messaging Service (MMS); Media formats and codecs (Release 7) available from http://www.3gpp.org/ftp/specs/html-info/26410.htm, Jun. 6, 2007.
Matthius Douze, Herve J'egove and Cordella Schmid, "An Image-Based Approach to Video Copy Detection with Spatio-Temporal Post-Filtering" IEEE Transactions on Multimedia, No. 4, pp. 257-266, available on the internet at http://lear.inrialpes.fr/pubs/2010/DJS!)douze_tmm.pdf, 2010.
Xing Su, Tiejun Huang, Wen Gao, "Robust Video Fingerprinting base on Visual Attention Regions" IEEE International Conference on Acoustics Speech and Signal Processing, available on internet at http://www.jdl.ac.cn/doc/2009/ROBUST%20VIDEO%20FINGERPRINTING%20BASED%20ON%VISUAL%20ATTENTION%20REGIONS.pdf, Apr. 19-26, 2009.

\* cited by examiner

MODULAR TRANSCODING PIPELINE

RELATED APPLICATIONS

The present application is a continuation of U.S. patent application Ser. No. 12/334,452, filed Dec. 13, 2008, which is a continuation-in-part of U.S. patent application Ser. No. 12/118,690 filed on May 10, 2008, which claims priority from U.S. patent application Ser. No. 60/971,111 filed Sep. 10, 2007, which are incorporated herein by reference.

FIELD OF THE INVENTION

The present invention relates generally to the multimedia messaging service (MMS) and more specifically to the modification of media contained in a MMS message into an adapted message.

BACKGROUND OF THE INVENTION

The multimedia messaging service (MMS) as described, e.g., in the OMA Multimedia Messaging Service specification, Approved Version 1.2 May 2005, Open Mobile Alliance, OMA-ERP-MMS-V1_2-200504295-A.zip, which is available at the following URL http://www.openmobilealliance.org/Technical/release_program/
mms_v1_2.aspxhttp://www.openmobilealliance.org/release_program/mms_v1_2.html, provides methods for the peer-to-peer and server-to-client transmission of various types of data including text, audio, still images, and moving images, primarily over wireless networks.

While the MMS provides standard methods for encapsulating such data, the type of data may be coded in any of a large number of standard formats such as plain text, 3GP video and audio/speech, SP-MIDI for synthetic audio, JPEG still images (details on any one of those refer to Multimedia Messaging Service, Media formats and codecs, 3GPP TS 26.140, V7.1.0 (2007-06), available at the following URL http://www.3gpp.org/ftp/Specs/html-info/26140.htm). Still images are frequently coded in the JPEG format for which a software library has been written by "The independent jpeg group" and published at ftp.uu.net/graphics/jpeg/jpegsrc.v6b.tar.gz.

FIG. 1 illustrates one example of a MMS system architecture 100, including an Originating Node 102, a Service Delivery Platform 104, a Destination Node 106, and an Adaptation Engine 108. The Originating Node 102 is a device capable of communicating with the Service Delivery Platform 104 over a Network "A" 110. Similarly the Destination Node 106 is a device capable of communicating with the Service Delivery Platform 104 over a Network "B" 112. The Networks "A" and "B" are merely examples, shown to illustrate a possible set of connectivities, and many other configurations are also possible. For example, the Originating and Destination Nodes (102 and 106) may be able to communicate with the Service Delivery Platform 104 over a single network; the Originating Node 102 may be directly connected to the Service Delivery Platform 104 without an intervening network, etc.

The Adaptation Engine 108 may be directly connected with the Service Delivery Platform 104 over a link 114 as shown in FIG. 1, or alternatively may be connected to it through a network, or may be embedded in the Service Delivery Platform 104.

In a simple case, the Originating Node 102 may send a (multimedia) message that is destined for the Destination Node 106. The message is forwarded through the Network "A" 110 to the Service Delivery Platform 104 from which the message is sent to the Destination Node 106 via the Network "B" 112. The Originating and Destination Nodes (102 and 106) may for instance be wireless devices, the Networks "A" and "B" (110 and 112) may in this case be wireless networks, and the Service Delivery Platform 104 may be a computer system, which provides the multimedia message forwarding service.

In another instance, the Originating Node 102 may be a server of a content provider, connected to the Service Delivery Platform 104 through a data network, i.e. the Network "A" 110 may be the Internet, while the Network "B" 112 may be a wireless network serving the Destination Node 106 which may be a wireless device.

In a more general case, the capabilities of the Destination Node 106 may not include the ability to receive, decode, or display the message in the form in which it was sent from the Originating Node 102. In order for the Destination Node 106 to handle the message, the message received from the Originating Node 102 may be modified through an adaptation software module 116, comprising computer readable instructions stored in a computer readable medium, running in the Adaptation Engine 108 before the message is delivered to the Destination Node 106.

In the example configuration of FIG. 1, transmission of a message from the Originating Node 102 to the Destination Node 106 would involve the following five steps, assuming that message adaptation is required:

1: a "source message" is sent from the Originating Node 102 to the Service Delivery Platform 104;
2: the Service Delivery Platform 104 determines the capabilities of the Destination Node 106, for example by interrogating the Destination Node 106 directly or by consulting a database of capabilities;
3: the Service Delivery Platform 104 sends a request to the Adaptation Engine 108, the request including the original "source message", and a description of the capabilities of the Destination Node 106;
4: the set of software modules 116 in the Adaptation Engine 108 performs the adaptation of the "source message" into an "adapted message"; and
5: the Adaptation Engine 108 returns the "adapted message" to the Service Delivery Platform 104 which forwards it to the Destination Node 106.

An overview of server-side adaptation for the Multimedia Messaging Service (MMS) is given in a paper "Multimedia Adaptation for the Multimedia Messaging Service" by Stéphane Coulombe and Guido Grassel, IEEE Communications Magazine, vol. 42, no. 7, pp. 120-126, July 2004.

Recent and continuing advances in the creation of media content in an ever increasing variety of formats, combined with the proliferation of capabilities and also different limitations of destination devices, have led to the need for a more flexible adaptation system that is scalable and provides increased performance and maintainability.

SUMMARY OF THE INVENTION

It is therefore an object of the invention to provide a method and system for adapting multimedia that provides a flexible adaptation system that is scalable and provides increased performance and maintainability.

According to one aspect of the invention, there is provided a modular system, comprising a processor and a computer readable storage medium, comprising computer readable instructions stored thereon for execution by the processor, for processing a transcoding request, including an input media into an adapted output media, the system comprising:

- a transcoding pipeline module, comprising a transcoding operations module for processing the input media into the adapted output media;
- a first set of software modules for fulfilling the transcoding request, including one or more builder modules for dynamically building the transcoding pipeline module, and a director module for selecting the one or more builder modules according to information in the transcoding request, and
- a second set of software modules, comprising one or more transcoding object modules, for performing transcoding operations of the transcoding pipeline module;
- wherein the selected builder modules comprise means for creating the transcoding operations module from the transcoding object modules.

The transcoding pipeline module further comprises a sub-pipeline module, created by said one or more builder modules, for processing a part of the transcoding request. The first set of software modules further includes one or more scribe modules, each scribe module adapted for one of the reading, decoding, encoding, scaling, or writing of the input media and the adapted output media objects in a form of documents. Conveniently, a document has a structure, which is suitable for processing by the transcoding object modules, and is different from that of the input media and the adapted output media.

Each of the one or more builder modules comprises a builder query function module, indicating a capability of the builder module; and the director module comprises a builder selection module communicating with the query function modules for determining capabilities of the builder modules and matching the capabilities with the information in the transcoding request.

Beneficially, each of the one or more builder modules further comprises a sub-builder selection module for communicating with the builder selection module of the director, requesting from the director to select other builder modules, which are capable of performing parts of the transcoding request. The second set of software modules further comprises a Document Transcoder module for converting one document into another.

The system of the embodiments of the invention further comprises a Transcoder Output Dataset module, including a Transcoding Result module for storing messages, errors and warnings issued during the performing of the transcoding operations, and a Characterization Result module for storing information about the input media and the adapted output media.

According to another aspect of the invention, there is provided a method for processing a transcoding request including an input media, into a Transcoder Output Dataset including an adapted output media, the method comprising steps of:

- (a) receiving the transcoding request;
- (b) reading a transform command of the transcoding request;
- (c) selecting a plugin program of a collection of software modules, which is associated with the transform command;
- (d) executing the selected plugin program, thereby transcoding the input media into the adapted output media; and
- (f) generating the transcoder output dataset including the adapted output media.

The step (d) of the method comprises:

- (g) extracting the input media into components of an input document;
- (h) creating a main transcoding pipeline including transcoding operations, to match operation requests implicit in the transcoding request and the input document;
- (i) optimizing the main transcoding pipeline by removing redundant transcoding operations 218 from the main transcoding pipeline; and
- (j) executing the transcoding operations of the main transcoding pipeline to generate the adapted output media.

In the method described above, the collection of software modules comprises a director module and one or more scribe modules for dealing with documents, and wherein the step (g) comprises:

- (k) calling the director module to find a read scribe module in the one or more scribe modules;
- (l) the director module obtaining a list of all scribe modules in the one or more scribe modules;
- (m) the director module querying each scribe module in the list of all scribe modules with a read query;
- (n) the director module selecting the read scribe module, which returns an affirmative reply to the read query; and
- (o) the read scribe module reading the input media and generating the input document.

In the method described above, the collection of software modules further comprises one or more builder modules for constructing the transcoding pipeline, and wherein the step (h) comprises:

- (p) calling the director module to find in the one or more builder modules a correct builder module capable of building the transcoding pipeline to fulfill the transcoding request;
- (q) the director module obtaining a list of all builder modules in the collection of builder modules;
- (r) the director module querying each builder module in the list of all builder modules with a pipeline construction query;
- (s) the director module selecting the builder module, which returns an affirmative reply to the pipeline construction query as the correct builder module; and
- (t) the correct builder module creating the transcoding pipeline.

In the method described above, the collection of software modules further comprises a collection of transcoding object modules, and wherein the step (t) comprises:

- (u) designating the correct builder module as a currently active builder module;
- (v) designating an empty transcoding pipeline as a current pipeline and designating the Transcoding Request as an unfulfilled operation request;
- (w) jumping to the step (ee) if no unfulfilled operation request is found;
- (x) the currently active builder module finding and selecting a matching transcoding object module from the collection of transcoding object modules, which is capable of fulfilling the unfulfilled operation request; and jumping to the step (aa) if the currently active builder module is unable to find the matching transcoding object module;
- (y) designating the matching transcoding object module as capable of performing a matching transcoding operation and attaching it at the end of the current pipeline to fulfill the unfulfilled operation request;

(z) repeating the steps (w) to (y);

(aa) creating an empty sub-pipeline; attaching it at the end of the current pipeline; and dividing the unfulfilled operation request into unfulfilled sub-requests;

(bb) getting a supporting builder module that can support the first unfulfilled sub-request from the director module, designating said builder module as the currently active builder module, and designating the first unfulfilled sub-request as the unfulfilled operation request;

(cc) designating the empty sub-pipeline as the current pipeline;

(dd) repeating the steps (w) to (cc) with each subsequent unfulfilled sub-request as the unfulfilled operation request; and (ee) ending the step (t).

In the method described above, the transcoding request further includes a destination profile that defines characteristics of an intended recipient of the adapted output media, and wherein the step (j) comprises:

(ff) transferring execution to the main transcoding pipeline, which includes attached transcoding operations, and recursively attached sub-pipelines with attached transcoding operations;

(gg) executing the transcoding operations in a depth first order, thereby processing the components of the input document into components of an output document;

(hh) calling the director module to find a write scribe module in the collection of scribe modules;

(ii) the director module obtaining a list of all scribe modules in the collection of scribe modules;

(jj) the director module querying each scribe in the list of all scribe modules with a write query;

(kk) the director module selecting the scribe module, which returns an affirmative reply to the query as the write scribe module; and (ll) the write scribe module converting the output document into the adapted output media of the transcoder output dataset in a format implied in the destination profile.

Conveniently, the step (j) includes generating a transcoding result, which comprises messages, errors and warnings issued during the executing.

According to yet another aspect of the invention, there is provided a transcoding pipeline module, comprising computer readable instructions stored in a computer readable storage medium, for transcoding an input media into an adapted output media, the transcoding pipeline including an ordered list of:

one or more transcoding operations modules, each transcoding operation module transcoding components of the input media into components of the adapted output media; and zero or more sub-pipelines modules, each sub-pipeline module including at least one of the transcoding operations modules.

A modular system for creating and executing the transcoding pipeline module as described above is also provided, including:

a first set of software modules for dynamically constructing the transcoding pipeline module, including one or more builder modules, and a director module for selecting builder modules according to information in a transcoding request;

a second set of software modules, comprising one or more transcoding object modules, for performing transcoding operations of the transcoding pipeline module;

wherein the selected builder modules comprise means for creating the transcoding operations modules from the transcoding object modules.

In the system described above, one or more builder modules includes at least one builder module adapted to creating a sub-pipeline module for processing a part of the transcoding request and attaching it to the transcoding pipeline module. Conveniently, at least one of the transcoding object modules is adapted to perform a transcoding operation.

According to one more aspect of the invention, there is provided a computer system for adapting a multimedia message, including an input media, to an adapted message, including an adapted output media, the computer system including a computer having a port for receiving a transcoding request, a memory for storing software modules comprising computer readable instructions stored in the memory, for processing the transcoding request including the multimedia message and a destination profile, describing limitations and characteristics of the adapted message, wherein the software modules include:

a first set of software modules for dynamically constructing a transcoding pipeline module, including one or more builder modules, and a director module for selecting builder modules according to information in the transcoding request;

a second set of software modules, comprising one or more transcoding object modules, for performing transcoding operations of the transcoding pipeline module;

wherein the selected builder modules comprise means for creating the transcoding operations module from the transcoding object modules.

In the computer system described above, each of the one or more builder modules comprises a builder query function module, indicating a capability of the builder module; and the director module comprises a builder selection module communicating with the query function modules for determining capabilities of the builder modules and matching the capabilities with the information in the transcoding request.

A computer readable storage medium, comprising computer readable instructions, which when executed, perform the steps of the methods described above, is also provided.

BRIEF DESCRIPTION OF THE DRAWINGS

Embodiments of the invention will now be described, by way of example, with reference to the accompanying drawings, in which.

DETAILED DESCRIPTION OF THE EMBODIMENTS OF THE INVENTION

It is an objective of the embodiments of the invention to provide a flexible software system which has the ability to dynamically build a sequence of programs and operations into a transcoding pipeline which accepts a transcoding request, processes data included in the transcoding request by performing operations requested or implied in the transcoding request, and produces a transcoding output.

Figure 2:
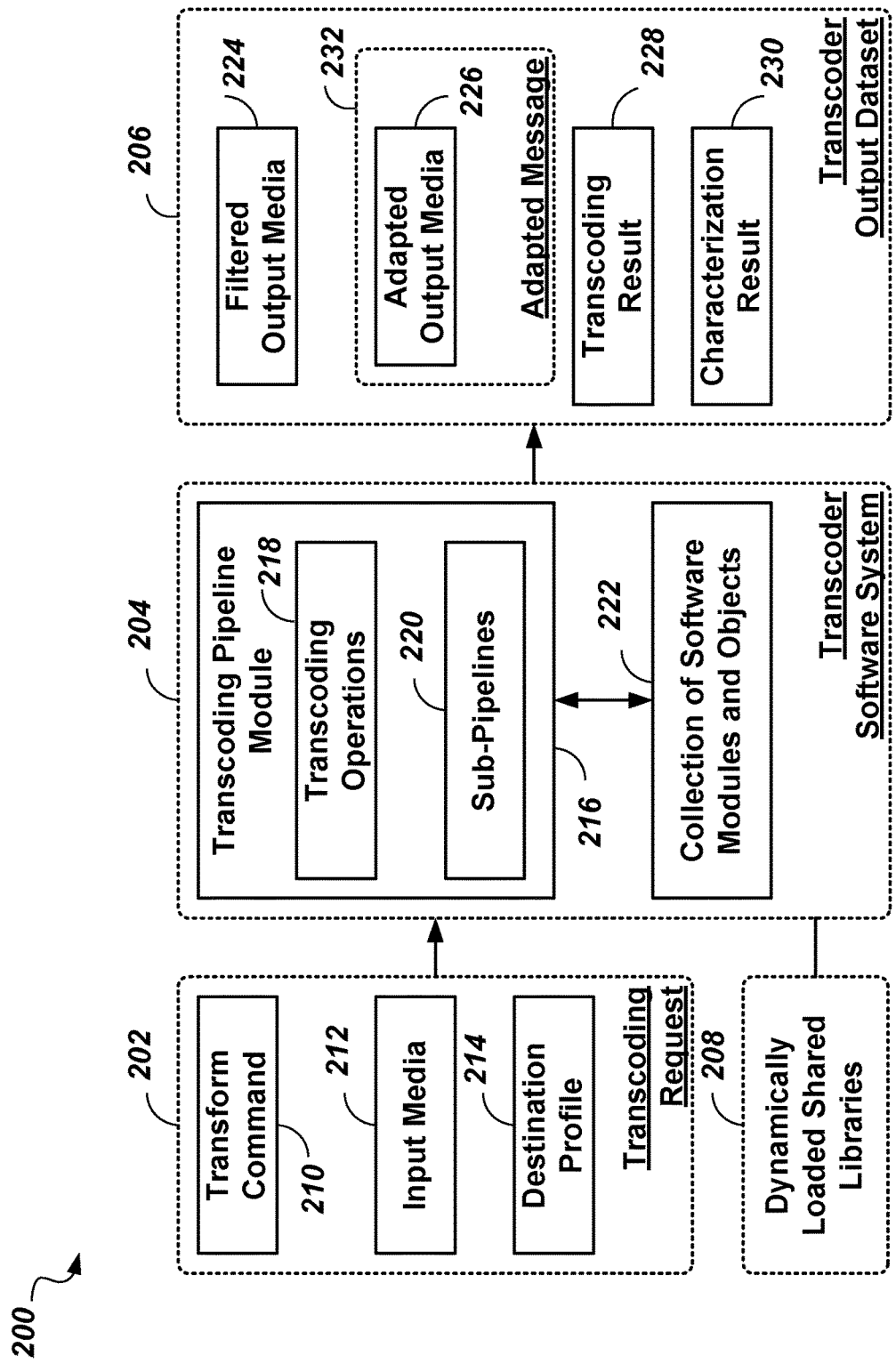
FIG. 2 illustrates an Adaptation Architecture 200 of an embodiment of the present invention.

FIG. 2 illustrates an Adaptation Architecture 200 of an embodiment of the present invention, including a Transcoding Request 202, a modular Transcoder Software System 204, a Transcoder Output Dataset 206, and one or more optional Dynamically Loaded Shared Libraries 208.

The Transcoding Request 202 is a dataset including one or more Transform Commands 210, one or more Input Media 212, and a Destination Profile 214. The Transcoding Request 202 is input to the Transcoder Software System 204 which comprises: a Transcoding Pipeline 216 including a set of Transcoding Operations 218 and zero or more Sub-Pipelines 220, which have the same properties as the Transcoding Pipeline 216; and a Collection of Software Modules and Objects 222. The Transcoder Software System 204, using the Transcoding Request 202 as its input, dynamically constructs the Transcoding Pipeline 216 and then generates the Transcoder Output Dataset 206, which may include: zero or more Filtered Output Media 224; zero or more Adapted Output Media 226; a Transcoding Result 228; and a Characterization Result 230.

The Transcoder Software System 204 comprises a computer having a processor (not shown), and software modules, which include computer readable instructions stored in a computer readable medium, for example, memory, CD-ROM, DVD or other, to be processed by the processor to perform various operations of these modules as described in detail below. In this application, the Transcoding Pipeline 216 is also referred to as a Transcoding Pipeline module 216; the Transcoding Operations 218 are also referred to as Transcoding Operations modules 218; the Sub-Pipelines 220 are also referred to as Sub-Pipeline modules 220; the Transcoder Output Dataset 206 is also referred to as a Transcoder Output Dataset module 206; the Transcoding Result 228 is also referred to as a Transcoding Result module 228; and the Characterization Result 230 is also referred to as a Characterization Result module 230.

While the Adaptation Architecture 200 has general application for adapting input media according to an arbitrary profile, into output media, it may be advantageously used in the adaptation of an input multimedia message for transmitting to a destination device that is characterized by this profile, i.e. the Destination Profile 214. In such an application, the input multimedia message is the Input Media 212, the Transform Command 210 has a value of "Transcode" while the Adapted Output Media 226 is formatted as an Adapted Message 232 that is compatible with the Destination Profile 214 of the Transcoding Request 202.

Figure 1:
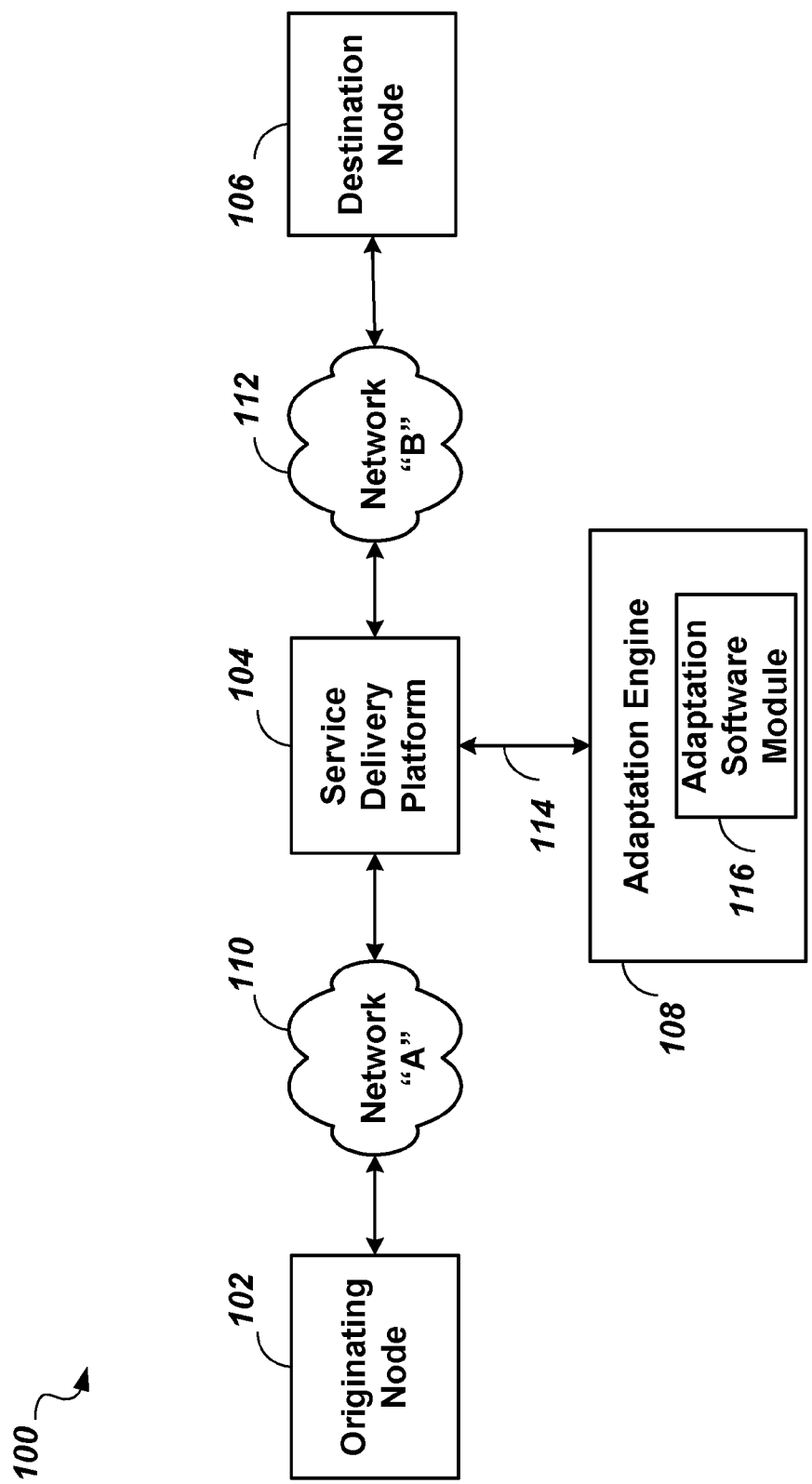
FIG. 1 illustrates an example of an MMS system architecture 100 of the prior art.

The Transcoder Software System 204 of the present invention may advantageously be installed in an Adaptation Engine 108 (FIG. 1) for performing adaptation in an MMS system, but may also preferentially be used in any system that provides adaptation or transcoding of media from one media format to another.

In general terms, the Transcoder Software System 204 in the Adaptation Architecture 200 is designed to accept the Transcoding Request 202, interpret its contents to dynamically construct an instance of the Transcoding Pipeline 216, which is an ordered list or a tree of Transcoding Operations 218.

The completed Transcoding Pipeline 216 may then be optimized, for example, the tree of the Transcoding Operations 218 may be flattened into a simple ordered list, and redundant ones of the Transcoding Operations 218 may be combined or removed, in order that the optimized Transcoding Pipeline 216 can be executed more efficiently to perform the adaptation of the Input Media 212 into the Filtered and/or Adapted Output Media (reference numerals 224 and 226 respectively). Execution of the optimized Transcoding Pipeline 216 may also provide other outputs, such as the Transcoding Result 228 which comprises messages, errors and warnings issued during processing, and the Characterization Result 230 which contains information about the properties of the resulting media (i.e. the Adapted Output Media 226 and the Filtered Output Media 224). The generation of the Characterization Result 230 is configurable, and the Characterization Result 230 may also include the properties of any media taking part in a given adaptation request, that is any input media and any resulting media. It may be noted that the Filtered Output Media 224 comprises those Input Media 212 that are permitted by the Transcoding Request 202 to be passed through the Transcoder Software System 204 unaltered.

The Transcoding Request 202 of FIG. 2 is the main request (or "master input request") and may be broken down into smaller sub-requests of the same format. The purpose of sub-requests is to break down the work required to accomplish the task described by the master request. Generally speaking, each sub-request would contain only one transform command. It may contain any number of input media and a destination profile. The destination profile may be a copy of the original destination profile 214 or it may be a sub-profile. The destination profile 214 may be a message transcoding profile that provides characteristics of what the goal of message transcoding is but it may also refer to a group of single-media profiles. This group of single-media profiles provides the sub-profiles which are selected in the creation of the sub-request. The main request and the sub-requests are used throughout the architecture as clear interfaces between media objects (the Input Media 212, the Filtered Output Media 224, the Adapted Output Media 226) and the software components of the Transcoder Software System 204, and collectively contain all necessary information to describe the work to be performed which will ultimately be fulfilled by executing the Transcoding Operations 218 of the Transcoding Pipeline 216.

The Transform Commands 210 of the Transcoding Request 202 specify operations to be performed on the Input Media 212, while the target characteristics of the adapted or filtered output media (226 and 224), and the required output media formats are specified in the Destination Profile 214. Generally, each of the Transform Commands 210 in the Transcoding Request 202 may be one of "Transcode", "Filter Content", or "Characterize", and may refer to one, or more, or all of the Input Media 212. A Transform Command has the following structure:

an identifier of the command;
a reference to a set of media that the command is intended to work with; and
a set of property/value pairs providing arguments indicating options for the given command.

As part of the structure of the transform command, the media on which the command is to work are specified. In the present context, the master request, i.e. the Transcoding Request 202 specifies a set of input media, i.e. the Input Media 212, and one or more Transform Commands 210. Any Transform Command 210 can only refer in its structure to media that are part of the master request.

Other variations of Transform Commands 210 may also be defined, and may be supported in the structure of the Transcoder Software System 204 through the addition of modules having the required functions to support these other Transform Commands 210. The Transcoder Software System 204 is very flexible, and structured to facilitate the easy addition of functionality, a fact which will become evident in the description of the embodiment of the invention.

In the following, the process of dynamically creating the Transcoding Pipeline 216 by processing the information in the Transcoding Request 202 in the Transcoder Software System 204 will be described in more detail.

In a simple (and most common) form of the Transcoding Request 202, there is only one Transform Command 210 which may be thought of as an instruction that has the Input Media 212 and the Destination Profile 214 as arguments, for example the Transform Command 210 "Transcode" would be interpreted to transcode the Input Media 212 (which may be an MMS message, for example) in accordance with the Destination Profile 214 (which may indicate that the destination is able to receive email with certain restrictions, for example limited to a maximum image size).

Typically the Transcoding Request 202 contains relationships between one or more of the input media (i.e. the Input Media 212), to one or more of the output media (i.e. the Adapted Output Media 226 and the Filtered Output Media 224). But depending on subsequent operations a recursive relationship may exist where the output media may be used as input media in a subsequent Transcoding Request 202. It is often required that in order to accomplish the work described in one request (either the master request or one if its sub-requests) needs to be done in several steps. It is often the case that "intermediate output" media are created. "Intermediate Output" media are media that are created as the result of one operation. They are meant to be used as input in a sub-sequent operation. An "intermediate output" media is never included in the final Adapted Output Media 226. An "intermediate output" media represents an intermediate temporary state of a media being worked on. In the aforementioned patent application Ser. No. 12/118,690 filed on May 10, 2008 entitled "Method And System For Multimedia Messaging Service (MMS) To Video Adaptation" this is illustrated in a detailed example, where having this flexibility makes it possible to perform a complex transcoding task, in which an input message is converted into an output which is a single media video file. Such a conversion may require the creation of a number of "intermediate output" media to reach the final goal of an output media which is a video file representing the content of the input message but in the required output format.

Figure 3:
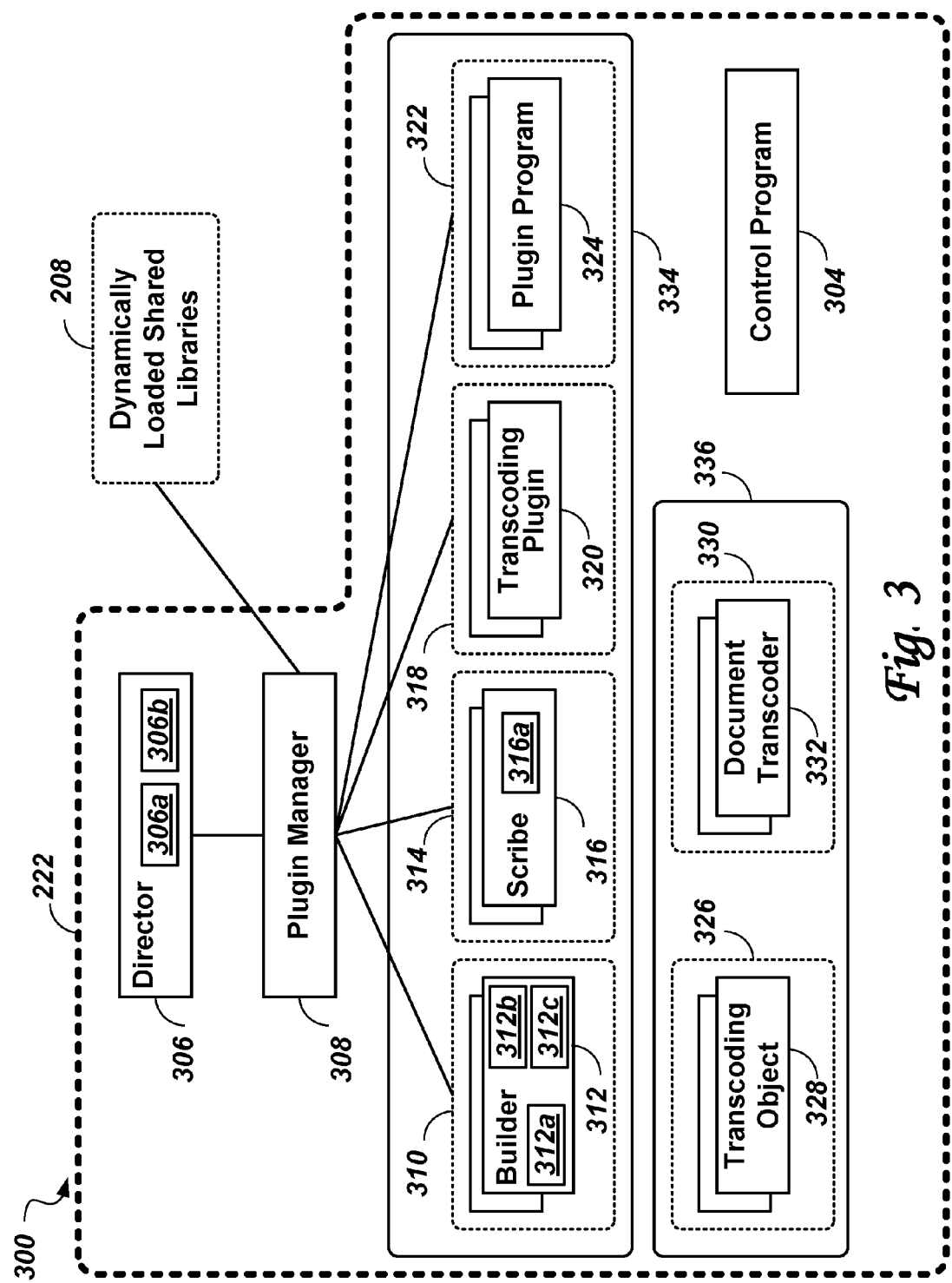
FIG. 3 shows a block diagram 300 of software modules included in the Transcoder Software System 204 of the Adaptation Architecture 200 of FIG. 2.

FIG. 3 shows a block diagram 300 of software modules included in the Transcoder Software System 204 of the Adaptation Architecture 200, i.e. the Collection of Software Modules and Objects 222 comprising:

a Control Program module 304;
a Director module 306;
a Plugin Manager 308;
a Builder Collection 310 including a plurality of Builders 312;
a Scribe Collection 314 including a plurality of Scribes 316;
a Transcoding Plugin Collection 318 including a plurality of Transcoding Plugins 320;
a Plugin Program Collection 322 including a plurality of Plugin Programs 324;
a Transcoding Object Collection 326 of Transcoding Objects 328; and
a Document Transcoder Collection 330 of Document Transcoders 332.

The Collection of Software Modules and Objects 222 comprises software modules, which include computer readable instructions stored in a computer readable medium, e.g. memory, CD-ROM, DVD or other, for processing by a computer. In this application, the Control Program 304 is also referred to as a Control Program module 304; the Director 306 is referred to as a Director module 306; the Plugin Manager 308 is referred to as a Plugin Manager module 308; the Builders 312 are referred to as Builder modules 312; the Scribes 316 are referred to as Scribe modules 316; the Transcoding Plugins 320 are referred to as Transcoding Plugin modules 320; the Plugin Programs 324 are referred to as Plugin Program modules 324; the Transcoding Objects 328 are referred to as Transcoding Object modules 328; and the Document Transcoders 332 are referred to as Document Transcoder modules 332.

Note that the term "Transcoding Object" is used here to define the uncommitted software object in the collection or library, the term "Transcoding Operation" is used for the object when it is attached to the Transcoding Pipeline.

The Collection of Software Modules and Objects 222 includes two distinct sets of software modules, a first set 334 that has the capability to analyze the Transcoding Request 202 and to assemble the Transcoding Pipeline 216 by selectively attaching objects from a second set 336 which includes the Transcoding Object Collection 326, the Document Transcoder Collection 330, and other transcoding objects that may be present in the Dynamically Loaded Shared Libraries 208. The first set includes a hierarchy of software module collections, that is the Builder Collection 310, the Scribe Collection 314, the Transcoding Plugin Collection 318, and the Plugin Program Collection 322, all of which are managed by the Plugin Manager 308 under the control of the Director 306.

The block diagram 300 also shows the Dynamically Loaded Shared Libraries 208 linked to the Plugin Manager 308, both the Dynamically Loaded Shared Libraries 208 and the Plugin Manager 308 comprising computer readable instructions stored in a computer readable storage medium, e.g., memory, CD-ROM, DVD or the like, for retrieval and processing by a computer.

The Control Program 304 has overall control of the Transcoder Software System 204. It includes means to receive the Transcoding Request 202, for example from an I/O system of the Adaptation Engine 108 in which the Transcoder Software System 204 is installed. It analyses the Transcoding Request 202 to determine compatibility with the Transcoder Software System 204, and selects one of the Plugin Programs 324, i.e. the specific Plugin Program 324 that is associated with each Transform Command 210 of the Transcoding Request 202.

The Plugin Programs 324 to be invoked by the Transform Command 210 of the Transcoding Request 202, may be customized according to the Transform Command 210 that it serves. Within the scope of the embodiment of the invention, three different Plugin Programs 324 have been defined, corresponding to the three Transform Commands 210 "Transcode", "Filter Content", and "Characterize". The Plugin Programs 324 are written in a very simple textual language where each Plugin Program 324 comprises a sequence of statements of the form "Execute P", where "P" refers to the name of one of the Transcoding Plugins 320. The Plugin Program 324 may also include control statements such as "loop" and "goto". New Plugin Programs 324 may be easily designed to extend the functionality of the Transcoder Software System 204 and respond to additional Transform Commands 210.

Each Transcoding Plugin 320 is a software module designed to process an aspect of the Transcoding Pipeline 216. The sequence of Transcoding Plugins 320 called from the Plugin Program 324 thus allows customization of the Plugin Program 324, enabling the easy creation of new Plugin Programs 324 for future (possibly different) pipeline processing tasks. The Transcoding Plugins 320 presently defined include a "Decode Plugin", a "Create Pipeline Plugin", an "Optimize Plugin", an "Execute Pipeline Plugin", a "Characterize Plugin", and an "Unsetup Session Plugin".

While a small number of the Transcoding Plugins 320 may include a customized program most Transcoding Plugins 320 rely on other modular and reusable components of the Collection of Software Modules and Objects 222 for doing the actual processing of the media. The method of dynamically selecting the correct software components to process the Transcoding Request 202 is one of the innovative concepts of the embodiment of the invention.

The Plugin Manager 308 is a repository for storing the Builder Collection 310, the Scribe Collection 314, the Transcoding Plugin Collection 318, and the Plugin Program Collection 322. It is also responsible for linking to the Dynamically Loaded Shared Libraries 208 which may contain additional Builders 312, Transcoding Plugins 320, and Transcoding Objects 328. The Plugin Manager 308 is responsible for managing access to these software modules and objects from the Director 306.

The Director 306 manages the Builder Collection 310 and the Scribe Collection 314. The Director 306 includes a scribe selection module 306a that may be called by one of the Plugin Programs 324 to select from the Scribe Collection 314 one of the Scribes 316 that meets a specific Scribe capability. Similarly, the Director 306 includes a builder selection module 306b that may be called by another one of the Plugin Programs 324 to select from the Builder Collection 310 one of the Builders 312 that meets a specific builder capability.

The builder selection module 306b of the Director 306 may also be called by one of the Builders 312 to select from the Builder Collection 310 a yet other one of the Builders 312 that meets another specific builder capability. For example, the one of the Builders 312 may indicate to have the capability to do a complex job, but in order to carry out the complex job, needs to "subcontract" a part of the complex job to the yet other one of the Builders 312.

In the search for scribes or builders to select, the Director 306 also has access through the Plugin Manager 308 to external scribes and builders that may be provided in the Dynamically Loaded Shared Libraries 208.

Each Scribe 316 is a distinct software object that may include the capability of one of reading, decoding, encoding, scaling, and writing media objects in the form of Documents (see below for a definition of "Document"). Each Scribe 316 also includes a scribe query function module 316a that may be called in the form "Is Supported (X)", where "X" stands for an operation capability. The scribe query function returns "TRUE" if the scribe supports "X", and returns "FALSE" otherwise.

When the Director 306 is requested to find a scribe that has a capability to perform the operation "X", the Director 306 obtains from the Plugin Manager 308 a complete list of scribes (i.e. the Scribe Collection 314 as well as scribes that reside in the Dynamically Loaded Shared Libraries 208), then calls each scribe in the list with the scribe interrogation function "Is Supported (X)", and selects the first scribe that returns "TRUE". It is an error if no compliant scribe is found, and error handling takes over (see below).

One of the Scribes 316 may be a "read MMS Scribe" for example which has the capability of reading a complete MMS media object (the Input Media 212) from the Transcoding Request 202, and deposit its components (header, individual media attachments) and a record describing the structure of the media object as a "Document" into the memory of the Adaptation Engine 108.

While the complete list of scribes may be used for searching as a simple example of an implementation, other more efficient search algorithms may also be implemented.

Specific capabilities of each scribe are embedded in the scribe, which allows it to reply "TRUE" to the scribe interrogation function, and to then perform the required operation when subsequently called upon. Generally, the Scribes 316 have a capability to "work" with Documents, which are local in-memory representations of media objects including complex media objects such as a complete MMS message for example, where "work" includes reading, decoding, encoding, scaling, and writing. A scribe is a self contained object. Each Scribe has the capability to work on a specific type of media (reading, writing, etc). The capabilities that are implemented by a scribe are either coded as part of the scribe itself or may require the collaboration of some dynamically loaded shared library. A specific Scribe may read a physical input and create a memory representation from it. Another Scribe may create a physical output representation from a memory representation. A physical input or output media refers to the actual media file whereas a memory representation refers to the file that has been parsed and processed into a memory structure.

Each Transcoding Operation 218 (FIG. 2) is a Transcoding Object 328 that is attached to the Transcoding Pipeline 216 and performs a specific task by executing on information contained in the Transcoding Request 202. Each Transcoding Operation 218 is given arguments derived from the Transcoding Request 202 or a sub-request, when it is attached to the Transcoding Pipeline.

Each Builder 312 is a specialized software object that contains knowledge on how to select a specific Transcoding Object 328 as a Transcoding Operation 218, or a Sub-pipeline 220, to the Transcoding Pipeline 216. Each Builder 312 has the capability to analyze a request to determine if it has the knowledge to fulfill the request, and select a specific Transcoding Object 328 accordingly.

Similarly to the Scribes 316, each Builder 312 includes a builder query function module 312a that may be called in the form "Is Supported (X)", where "X" stands for an operation capability. The builder interrogation function returns "TRUE" if the builder supports "X", and returns "FALSE" otherwise.

When the builder query function module 312a is queried by the "Is Supported (X)" call, the builder examines the details of the request passed in the argument. It looks for specific request characteristics to determine if it is the one to handle that request. The characteristics it looks for are unique and are never duplicated by another builder. Each builder is created with a very specific intent. The entire set of builders is created with the intent of "building on one another". So each builder is implemented to address a specific problem that no other builder addresses. For example one of the builders may deal with all types of images. A different builder deals only with text media. Yet another builder will deal with all types of audio/video/animations. The description which follows provides a good example of how an MMS builder builds on the knowledge of other builders to create the parts of the pipeline that are required for attachments that an MMS may contain. The MMS builder would add operations that are required for creation of the output MMS, handling of errors and other support operations such as ensuring that the output MMS respects the maximum output file size (if one exists). Operations are implemented to physically resolve a specific issue. For example, an operation may be implemented which performs transcoding of input images to output images. Operations are implemented to be used by specific builders. The image transcoding operation discussed above is implemented for use by the image builder.

The Builders 312 can also act recursively and generate sub-requests to be handled by other Builders 312. For example, a "Message Builder" which is a particular instance of the Builders 312 has the ability to build a "Message Pipeline" (or main pipeline) which is an instance of the Transcoding Pipeline 216, and to query the Director 306 to find other Builders 312 that can generate a transcoding pipeline for each of the media contained in the message. If a message contains a video that needs to be resized, the "Message Builder" will query the Director 306 to find a "Video Builder", which is another instance of the Builders 312, that can generate a "video pipeline" (an instance of the Transcoding Pipeline 216) with operations specialized to resize a video. The resulting "video pipeline" is then added as a Sub-Pipeline 220 to the "Message Pipeline" (or main pipeline).

When the Director 306 is requested to find a builder that has a capability to perform the operation "X", the Director 306 obtains from the Plugin Manager 308 a complete list of builders (i.e. the Builder Collection 310 as well as builders that reside in the Dynamically Loaded Shared Libraries 208), then calls each Builder 312 with the builder query function "Is Supported (X)", and selects the Builder 312 that returns "TRUE".

The capability of each particular Builder 312 to support a particular operation resides in means 312c for creating specific transcoding operations 218 from the transcoding objects 328. That is a specific Transcoding Operation 218 that can perform a requested operation, is provided ultimately in the Transcoding Objects 328 that the particular builder is programmed to select. This "knowledge" is embedded in the builder and allows it to reply "TRUE" to the builder query function, and to perform the requested operation (i.e. attach a corresponding Transcoding Object 328 as a Transcoding Operation 218, or a sub-pipeline, to the Transcoding Pipeline 216) when the builder is called upon to execute. When called upon to execute, the builder may simply attach the appropriate Transcoding Operation(s) 218 at the end of the Transcoding Pipeline 216. When called upon to execute a more complex operation that may be decomposed into several sub-operations, these sub-operations may be individually accommodated by other builders. Thus in the embodiment of the invention builders for numerous combinations of operations are not needed, because when called upon to execute a more complex (composite) operation, a builder will simply create a main pipeline or sub-pipeline and, using a sub-builder selection module 312b, call the builder selection module 306b of the Director 306 to find these other builders. The other builders then each attach appropriate Transcoding Operations 218 at the end of the main pipeline or sub-pipeline respectively.

Expressed differently, the set of builders would come into play in the following manner. The MMS builder would see that a given input MMS contains attachments. It then goes through each input attachment, creates an output attachment and adds both to a new sub-request it creates. For example, the attachment may be an image attachment. The MMS builder would add an MMS profile to the sub-request. It would then call the director with that sub-request. An Optimal profile builder would notice that the request refers to an MMS message. It would then, as part of its responsibility, determine that the image profile, from the set of profiles the message profile references, is the one that applies to the new request. It would then change the MMS profile to an Image profile. It would then call the director to find the specific builder which addresses that type of request. The director would query the collection of builders and out of this collection, an image builder would determine that the request is that of an image transcoding request. It knows that that is the type of request it is responsible for by looking at the characteristics of the request (for example that the input media is an image, and that the profile is meant to generate an image). The image builder would then create an image transcoding operation for the new request and would return. The Optimal profile builder sees that the director's result is a success and itself returns. The MMS builder then notices that the director's call it made is a success. It would query the director to get the image transcoding operation, and proceed to append the image transcoding operation to the pipeline being built.

Each Document Transcoder 332 is a software module in the Collection of Software Modules and Objects 222 that is capable of converting one Document into another, for example an email Document into an MMS Document. The Document Transcoders 332 represent functions that can be used by the Transcoding Operations 218 to convert specific format presentations. The Document Transcoder Collection 330 may be seen as a "toolbox", to be accessed by a Transcoding Operation 218 when it needs to convert to a new document structure.

Document Transcoders 332 have the specific responsibility of creating an output memory representation of an input memory representation. The input and output memory representations may be of the same type, for example MMS to MMS or of a different type, for example convert a 3GPP Presentation into a Basic OMA Presentation. Thus, while Scribes 316 create memory documents from physical sources or create physical output from memory documents, Document Transcoders 330 adapt one memory document structure to another memory document structure.

Document Transcoders 332 may be queried with the IsSupported (X) function, similar to scribes and builders, to determine the best one to fulfill a request to convert one document structure to another document structure. For example a Document Transcoder 332 might convert a 3GPP Presentation into a Basic OMA Presentation. If the input document structure was a 3GPP presentation, and the desired output document structure was a Basic OMA presentation, this Document Transcoder 332 would be selected. The list of available Document Transcoders 332 can be extended via plugins (shared libraries).

The functions of the different building blocks may be summarized as follows:

Transcoding Objects 328 perform operations that are meant to physically solve a problem, for example perform transcoding of an input image to an output image. A Builder 312 knows which operations it needs to address some part of the problem it (the builder) is responsible for. Consequently, operations are specifically chosen by builders who know exactly what operation they need.

One function of Scribes 316 is to read a physical source and generate a memory representation from it. A different scribe may create a physical representation from a memory representation. The memory representations that the scribes create are "Documents". For example, when an input MMS is read, a memory "MMS document" is created. A scribe is responsible for being the bridge between physical formats and memory representations. Scribes are queried by the Director 306 with the "Is Supported (X)" method in order to find the right scribe given the work that needs to be accomplished. Only the right scribe "knows" that it is the expert for a given request.

The Document Transcoders 332 are meant to perform adaptation of "documents". They create output documents from input documents. Both the input and output may be of same type, or they may be of different formats. Document Transcoders 332 always uses as their input documents that were created by Scribes 316. Document Transcoders 332 only create "Documents" which are memory representation of media, and as such form the bridge between "Documents". Similar to the scribes, the Document Transcoders 332 may also be queried by the Director 306 with the "Is Supported (X)" method in order to find the right Document Transcoder 332 for accomplishing a given task.

The Builders 312 are designed to build a pipeline of Transcoding Operations 218 which are Transcoding Objects 328. They make use of Transcoding Objects 128 in the creation of the pipeline, and Document Transcoders 332 to create output documents from input documents. Builders are responsible for creating the pipeline of operations required to resolve the transcoding request or sub-request each Builder receives as an argument.

Executing the Transcoding Request 202

The individual software modules of the Transcoder Software System 204 have been described in FIG. 3. In the following the overall transcoding process is described.

Figure 4:
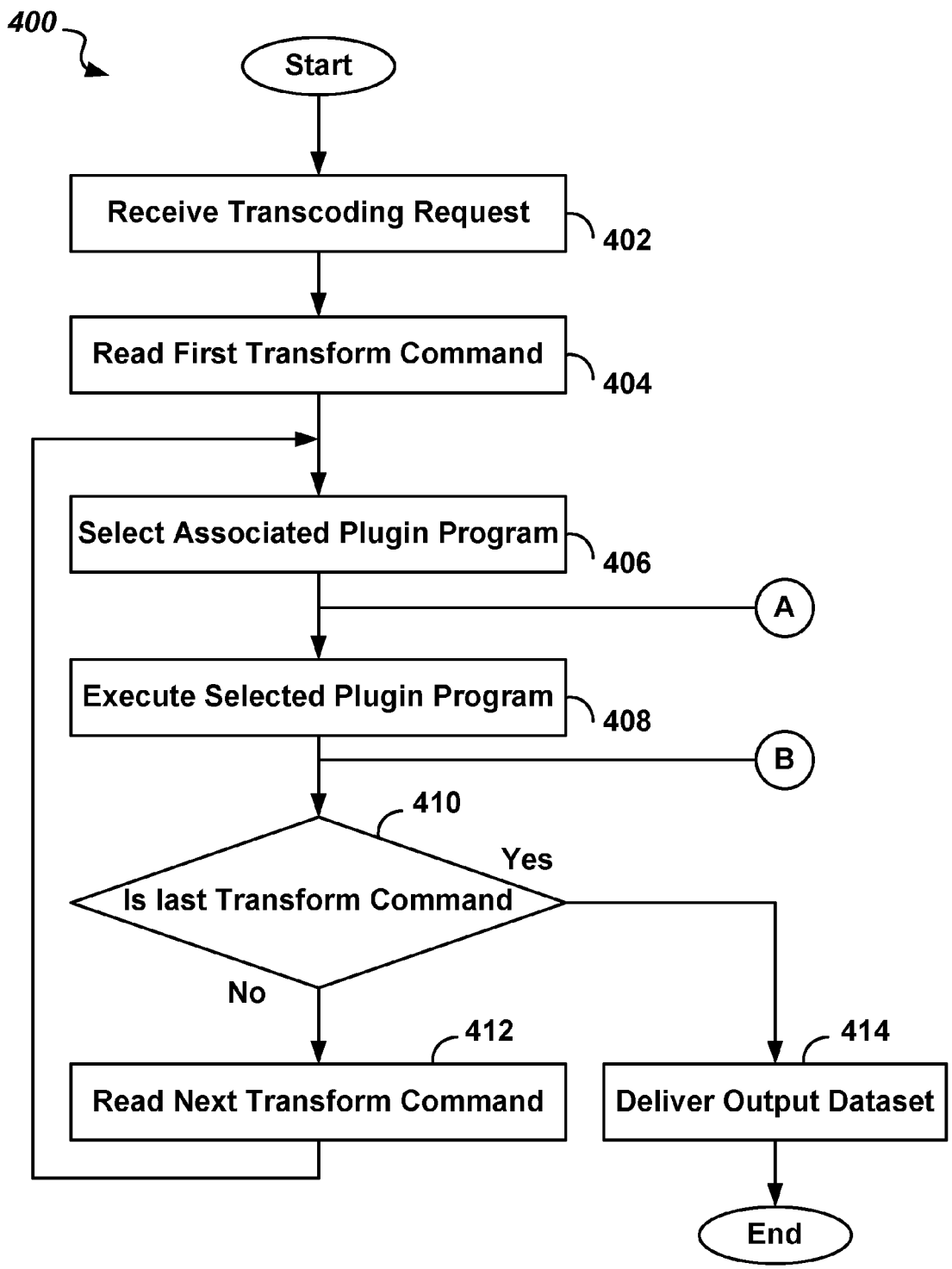
FIG. 4 illustrates a top level execution flow diagram 400 including steps performed by the Transcoder Software System 204 of FIG. 2.

FIG. 4 illustrates a top level execution flow diagram 400 including steps performed by the Transcoder Software System 204 to fulfill an arbitrary Transcoding Request 202, and generate the Transcoder Output Dataset 206, comprising steps:

402 "Receive Transcoding Request";
404 "Read First Transform Command";
406 "Select Associated Plugin Program";
408 "Execute Selected Plugin Program";
410 "Is last Transform Command";
412 "Read Next Transform Command"; and
414 "Deliver Output Dataset".

In the step 402 "Receive Transcoding Request", the Transcoding Request 202 is received through an I/O port of a computer (e.g. the computer housing the Adaptation Engine 108) by the Control Program 304 which has overall control of the Transcoder Software System 204.

In the step 404 "Read First Transform Command", the Control Program 304 reads the first Transform Command 210 of the Transcoding Request 202 and determines the associated Plugin Program 324. This first Transform Command 210 is now a current Transform Command (210).

Figure 5:
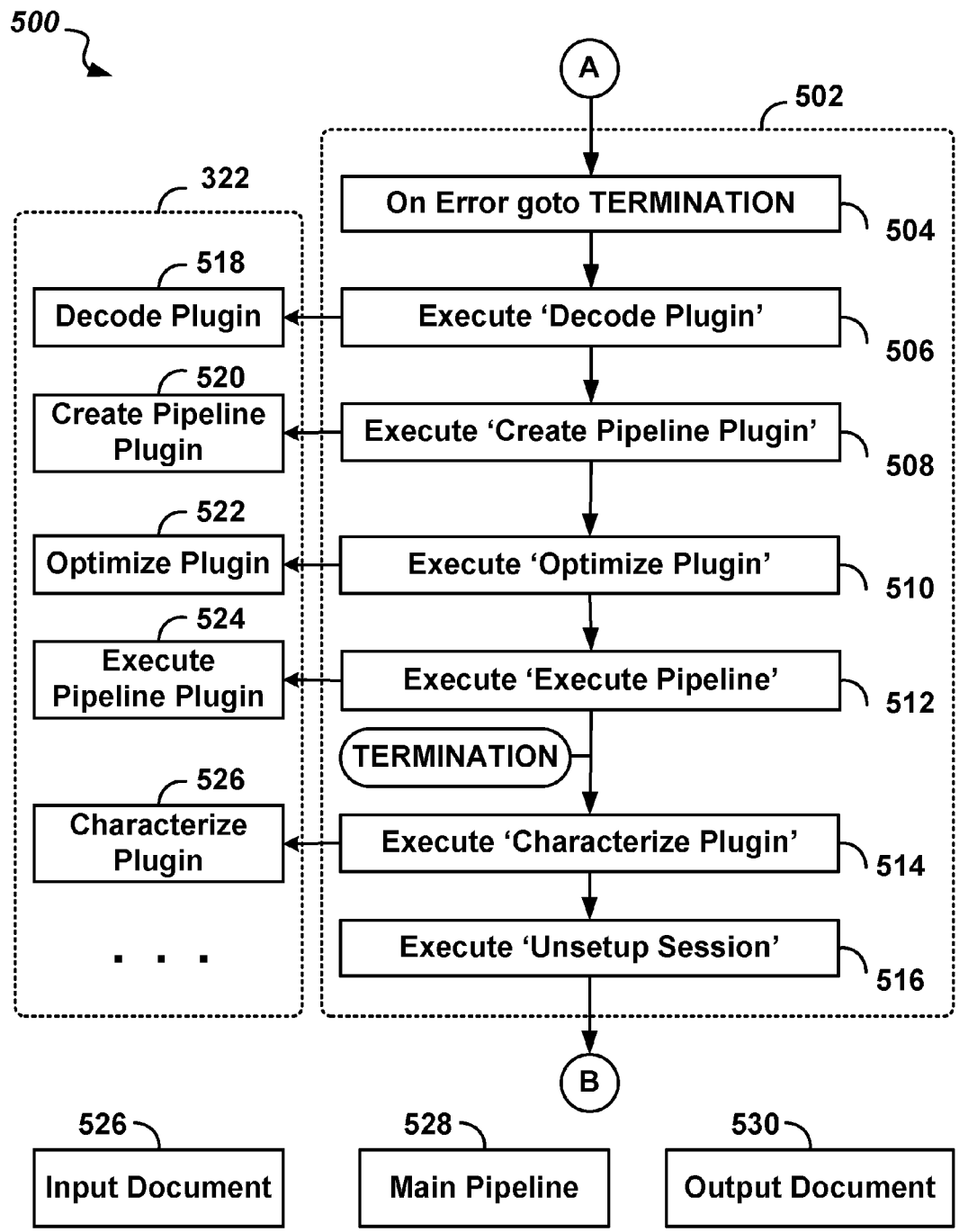
FIG. 5 illustrates an execution flow diagram 500 of a Transcode Program 502, which is an expansion of the step 408 of the top level execution flow diagram 400 of FIG. 4.

In the step 406 "Select Associated Plugin Program", the Control Program 304 selects a selected Plugin Program (324), that is associated with the current Transform Command (210);

In the step 408 "Execute Selected Plugin Program", the selected Plugin Program (324) is executed, details of a specific example of which are shown in FIG. 5 below. In executing the steps of the selected Plugin Program (324), the Transcoding Request 202 is processed into all or parts of the Transcoder Output Dataset 206.

In the step 410 "Is last Transform Command", the Control Program 304 determines if the current Transform Command (210) is the last Transform Command in the Transcoding Request 202. If it is (YES from the step 410) then the Transcoder Output Dataset 206 is delivered (step 414) otherwise the next Transform Command (210) is read in the step 412 "Read Next Transform Command" to become the current Transform Command (210) and execution loops back to the step 406 "Select Associated Plugin Program".

In the step 414 "Deliver Output Dataset", the completed Transcoder Output Dataset 206 is delivered to the user, for example in memory or through an I/O port of the computer.

FIG. 5 illustrates an execution flow diagram 500 of a Transcode Program 502, which is an expansion of the step 408 "Execute Selected Plugin Program", wherein the Transcode Program 502 is a representative selected example of the selected Plugin Program (324) of FIG. 4, corresponding to the "Transcode" Transform Command 210, comprising steps:

504 "On Error goto TERMINATION";
506 "Execute 'Decode Plugin'";
508 "Execute 'Create Pipeline Plugin'";
510 "Execute 'Optimize Plugin'";
512 "Execute 'Execute Pipeline'";
514 "Execute 'Characterize Plugin'"; and
516 "Execute 'Unsetup Session'".

The list of the steps 504 to 516 may be read as the actual textual language implementation of the Transcode Program 502 which illustrates its simplicity. Each of the steps 506 to 514 will be executed by a different one of the Transcoding Plugins 320, specifically:

The step 506 "Execute 'Decode Plugin'" is executed by a Decode Plugin 518.

The step 508 "Execute 'Create Pipeline Plugin'" is executed by a Create Pipeline Plugin 520.

The step 510 "Execute 'Optimize Plugin'" is executed by an Optimize Plugin 522.

The step 512 "Execute 'Execute Pipeline'" is executed by an Execute Pipeline Plugin 524.

The step 514 "Execute 'Characterize Plugin'" is executed by a Characterize Plugin 526.

Also shown in FIG. 5 are temporary data objects upon which the Transcode Program 502 operates:

an Input Document 526;

a Main Pipeline 528 which is an instance of the Transcoding Pipeline 216 of FIG. 2; and an Output Document 530;

In the step 504 "On Error goto TERMINATION", exception handling for the Transcode Program 502 is set up, by which a "TERMINATION" label is declared to which execution should jump if a processing error should occur in any of the steps before the "TERMINATION" label. As shown in FIG. 5, the "TERMINATION" label is attached to the start of the step 514 "Execute 'Characterize Plugin'". Thus, if an error should occur in the processing of the steps 506 to 512, execution would immediately jump to the step 514, bypassing the intermediate steps.

In the step 506 "Execute 'Decode Plugin'", the Decode Plugin 518 is executed in which the Input Media 212 of the Transcoding Request 202 (FIG. 2) is analyzed. The Input Media 212 may itself be a container for Media components or include attachments, all of which are extracted and written into the Input Document 526.

Figure 6:
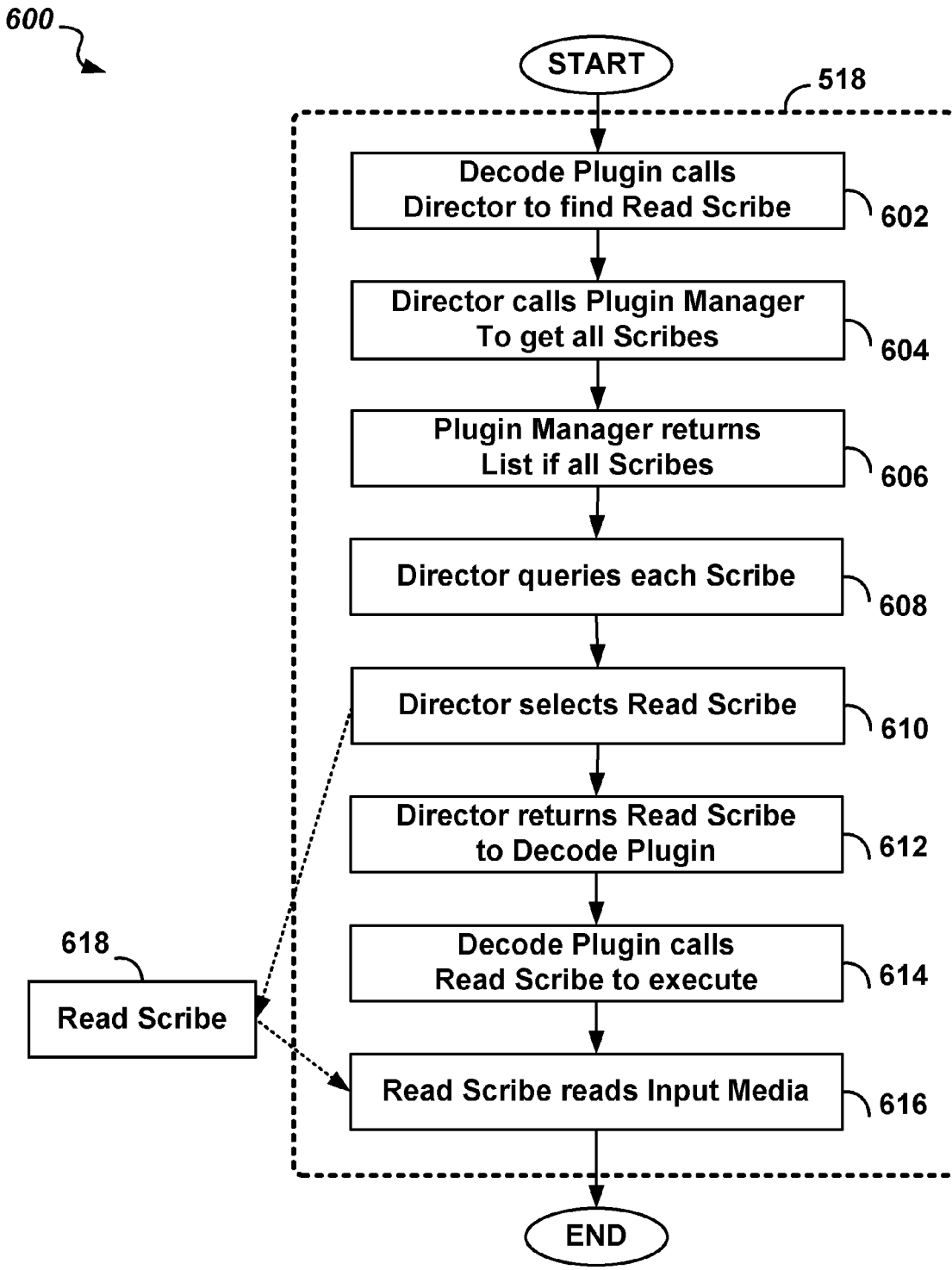
FIG. 6 shows a flowchart 600 of an expansion of the step 506 "Execute 'Decode Plugin'" of the execution flow diagram 500 of FIG. 5.

FIG. 6 shows a flowchart 600 of an expansion of the step 506 "Execute 'Decode Plugin'", specifically the execution of the Decode Plugin 518 which comprises steps:
602 "Decode Plugin calls Director to find Read Scribe";
604 "Director calls Plugin Manager to get all Scribes";
606 "Plugin Manager returns list of all Scribes";
608 "Director queries each Scribe";
610 "Director selects Read Scribe";
612 "Director returns Read Scribe to Decode Plugin";
614 "Decode Plugin calls Read Scribe to execute"; and
616 "Read Scribe reads Input Media".

The goal of the Decode Plugin 518 is to extract all the different media attachments that are included in the Input Media 212 of the Transcoding Request 202 (FIG. 2) which for example may be a MMS message. This step is necessary to convert the Input Media 212 into the Input Document 526 that describes the full scope of the input on which transcoding is to be done.

In the step 602 "Decode Plugin calls Director to find Read Scribe", the Decode Plugin 518 passes a scribe request to the Director 306 to find a Read Scribe 618, also referred to as a Read Scribe Module, that is able to read the Input Media 212 which may a MMS message for example, or more generally, of format 'X'.

In the step 604 "Director calls Plugin Manager to get all Scribes", the Director 306 calls the Plugin Manager 308 to get a list of all Scribes, that is the Scribes 316 in the Scribe Collection 314 as well as any Scribes that may reside in the Dynamically Loaded Shared Libraries 208.

In the step 606 "Plugin Manager returns list of all Scribes" the Plugin Manager 308 returns a present list of all Scribes, that is the Scribes 316 in the Scribe Collection 314 as well as any Scribes that may reside in the Dynamically Loaded Shared Libraries 208. It may be noted that the present list of all Scribes can include additional Scribes that may have been added from time to time, as a consequence of updating the Transcoder Software System 204, thus expanding the scope of formats accommodated with it.

In the step 608 "Director queries each Scribe", the Director 306 calls each of the Scribes in the present list of all Scribes with a "read query" that is of the form "Is Supported (X)", where "X" stands for an operation capability. In the present case, the operation capability "X" that is required, is to read a media file (the Input Media 212) and produce a Document. When called with the scribe query function each scribe examines the query to determine if it is able to perform the requested operation by examining the input media format (for example by reading a small part of the input media) and determining if this format is supported for the associated scribe operation.

In the step 610 "Director selects Read Scribe", the Director 306 selects the first Scribe in the present list of all Scribes that returns "TRUE" to the scribe query function, which will be the Read Scribe 618. It is assumed that the Read Scribe 618 is found, otherwise an error is indicated and the Transcode Program 502 jumps to the step 514, at the TERMINATION label, see FIG. 5.

In the step 612 "Director returns Read Scribe to Decode Plugin", the Director 306 returns the Read Scribe 618 to the Decode Plugin 518.

In the step 614 "Decode Plugin calls Read Scribe to execute", the Decode Plugin 518 calls the Read Scribe 618 directly to process the Input Media 212 into the Input Document 526.

In the step 616 "Read Scribe reads Input Media", the Read Scribe 618 reads the Input Media 212 and generates the Input Document 526 which includes the media components of the Input Media 212. The Input Document describes the structure of the Input Media 212 including embedded (attached) media.

In the case where the Input Media 212 is a container media, such as an MMS message, that includes contained media, the Decode Plugin 518 may be executed recursively in order to read each of the contained media, and create a separate Input Document 526 for each.

The reader's attention is now directed to return back to the next step of FIG. 5.

In the step 508 "Execute 'Create Pipeline Plugin'", the Create Pipeline Plugin 520 is executed in which the Main Pipeline 528 is dynamically created based on the information contained in the Transcoding Request 202 which now also includes the Input Document 526 written in the previous step 506. As described earlier, the Main Pipeline 528 may include Transcoding Operations 218 as well as Sub-Pipelines 220.

Figure 7:
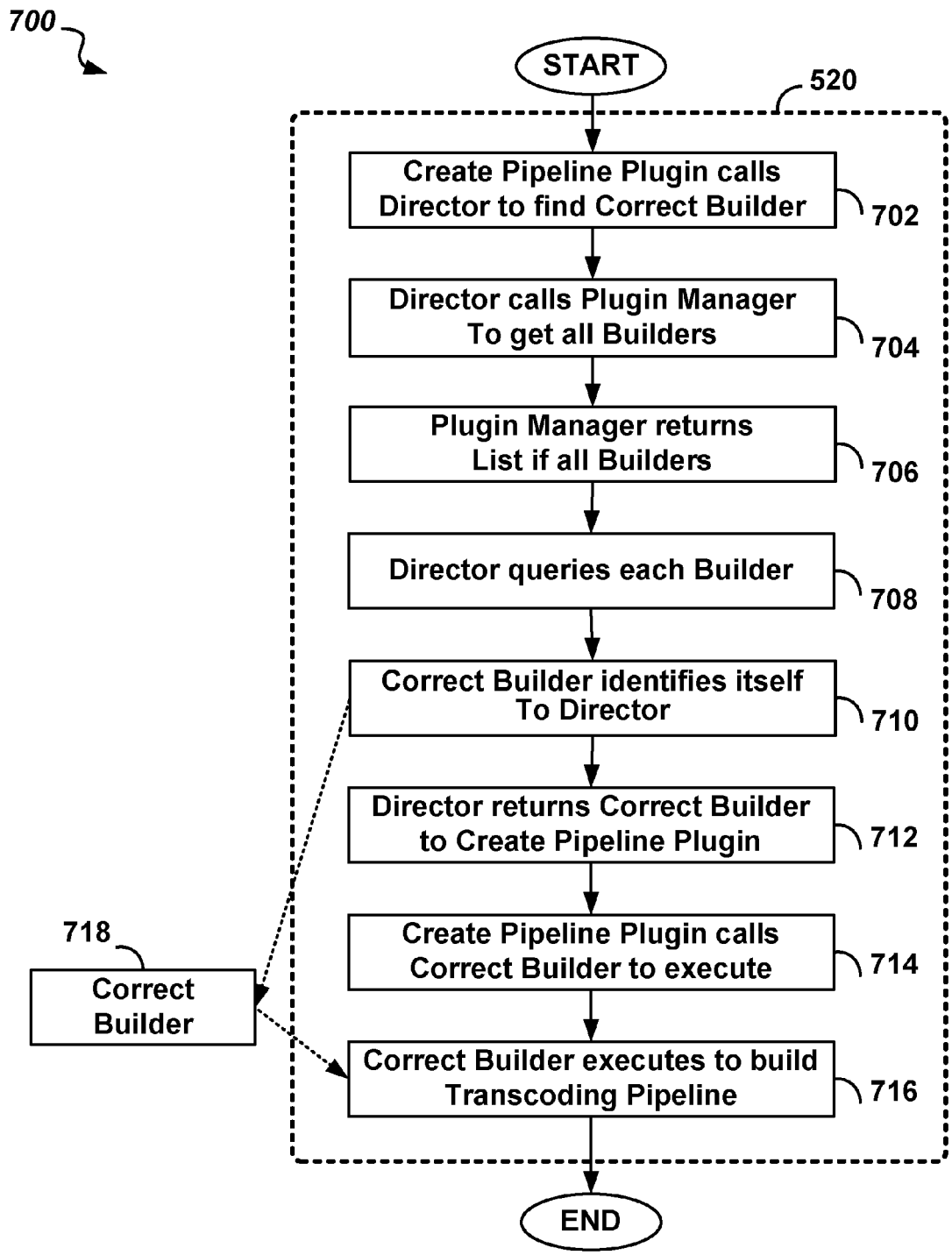
FIG. 7 shows a flowchart 700 of an expansion of the step 508 "Execute 'Create Pipeline Plugin'" of the execution flow diagram 500 of FIG. 5.

FIG. 7 shows a flowchart 700 of an expansion of the step 508 "Execute 'Create Pipeline Plugin'", specifically of the execution of the Create Pipeline Plugin 520 which comprises steps:
702 "Create Pipeline Plugin calls Director to find Correct Builder";
704 "Director calls Plugin Manager to get all Builders";
706 "Plugin Manager returns list of all Builders";
708 "Director queries each Builder";
710 "Correct Builder identifies itself to Director";
712 "Director returns Correct Builder to Create Pipeline Plugin";
714 "Create Pipeline Plugin calls Correct Builder to execute"; and
716 "Correct Builder executes to build Transcoding Pipeline".

The goal of the Create Pipeline Plugin 520 is to build the Main Pipeline 528 using information from the Transcoding Request 202 (FIG. 2) which now includes the Input Document 526 created in the previous step 518.

In the step 702 "Create Pipeline Plugin calls Director to find Correct Builder", the Create Pipeline Plugin 520 passes a builder request to the Director 306 to find a Correct Builder 718, also referred to as a Correct Builder Module, that is able to build the Main Pipeline 528 which is an instance of the Transcoding Pipeline 216, according to the format specification given in the Input Document 526, for example "MMS".

In the step 704 "Director calls Plugin Manager to get all Builders", the Director 306 calls the Plugin Manager 308 to get a list of all Builders, that is the Builders 312 in the Builder Collection 310 as well as any Builders that may reside in the Dynamically Loaded Shared Libraries 208.

In the step 706 "Plugin Manager returns list of all Builders" the Plugin Manager 308 returns a present list of all Builders, that is the Builders 312 in the Builder Collection 310 as well as any Builders that may reside in the Dynamically Loaded Shared Libraries 208. It may be worth noting here that the user of the Transcoder Software System 204 may add additional Builders (and other software objects such as Scribes) in the Dynamically Loaded Shared Libraries 208. These user defined software objects are then automatically included in any search for the correct software objects such as Scribes and Builders.

In the step 708 "Director queries each Builder", the Director 306 calls each of the Builders in the present list of all Builder with a "pipeline construction query", that is the builder query function that is of the form "Is Supported (X)", where "X" stands for an operation capability. In the present case, the operation capability "X" that is required, is to construct a transcoding pipeline, for example for processing an MMS message. When called with the builder query function each builder examines the query to determine if it is able to perform the requested operation. The roles of the different builders in the construction of the transcoding pipeline (or a sub-pipeline) is to create the structure of the pipeline or sub-pipeline, and to ultimately attach the appropriate transcoding operations 218 that are able to perform the operation that is advertised by each respective builder. The operation itself is not executed until the transcoding pipeline is complete, at which time all attached transcoding operations 218 are executed.

In the step 710 "Correct Builder identifies itself to Director", the Director 306 selects the first Builder in the present list of all Builders that identifies itself as the Correct Builder 718 capable of fulfilling the request by returning "TRUE" to the builder query function. It is assumed that the Correct Builder 718 is found, otherwise an error is indicated and the Transcode Program 502 jumps to the step 514, at the TERMINATION label, see FIG. 5. The Correct Builder 718 may, for example be a "MMS Builder".

In the step 712 "Director returns Correct Builder to Create Pipeline Plugin", the Director 306 returns the Correct Builder 718 to the Create Pipeline Plugin 520.

In the step 714 "Create Pipeline Plugin calls Correct Builder to execute", the Create Pipeline Plugin 520 calls the Correct Builder 718 directly to process the Transcoding Request 202.

In the step 716 "Correct Builder executes to build Transcoding Pipeline", the Correct Builder 718 generates the Main Pipeline 528. In general, the Correct Builder 718 is a top-level builder which begins by creating a root of the tree of the Main Pipeline 528 to which sub-pipelines are added as branches, the first sub-pipeline being a transcoding pipeline indicating the nature of the operation that the Correct Builder 718 advertises as being capable of performing, for example "Processing an MMS message". To actually process an MMS message, the Correct Builder 718 reads the Transcoding Request 202 which now includes the Input Document 526 and the Destination Profile 214, and enlists other builders to process each of the elements of the message.

Figure 8:
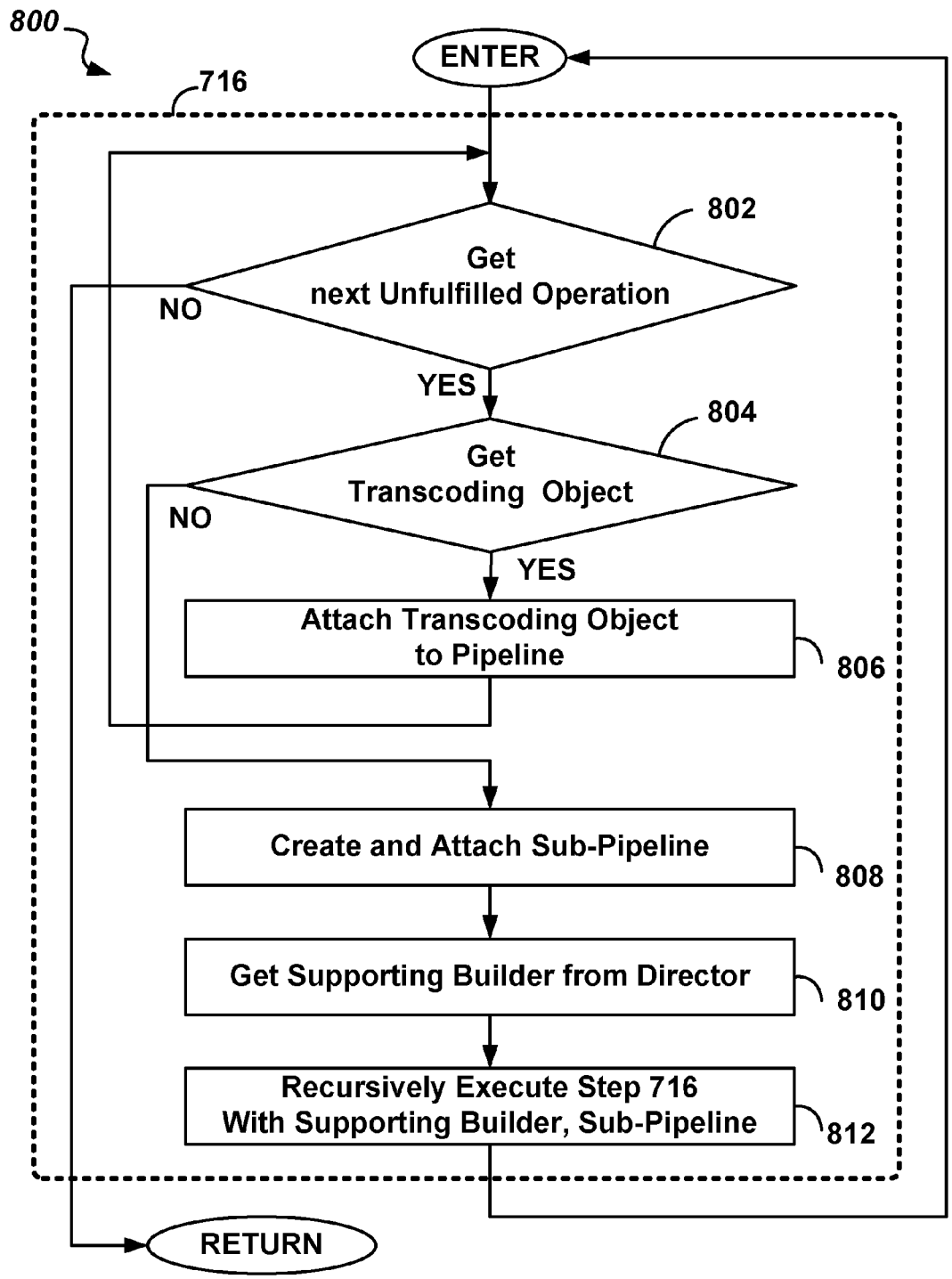
FIG. 8 shows a flowchart 800 of an expansion of the step 716 "Builder executes to build Transcoding Pipeline" of the flowchart 700 of FIG. 7.

FIG. 8 shows a flowchart 800 of an expansion of the step 716 "Builder executes to build Transcoding Pipeline", including steps:

802 "Get next unfulfilled operation";
804 "Get Transcoding Object";
806 "Attach Transcoding Object to Pipeline";
808 "Create and Attach Sub-Pipeline";
810 "Get Supporting Builder from Director"; and
812 "Recursively Execute Step 716, with Supporting Builder, Sub-Pipeline".

The step 716 "Builder executes to build Transcoding Pipeline" may be executed by the Correct Builder 718 to build the Main Pipeline 528 by analyzing the Input Document 526 and attaching Transcoding Operations 218 for each unfulfilled operation in the Input Document 526. However, the Correct Builder 718 may also attach an instance of the Sub-Pipeline 220 and enlist the help of other builders to populate the Sub-Pipeline 220 with Transcoding Operations 218, or even with further Sub-Pipelines 220.

This functionality is provided in the step 716 which may be called recursively to fulfill all operations indicated in the Transcoding Request 202 with Transcoding Operations 218.

In the step 802 "Get next unfulfilled operation", the next unfulfilled operation request from the Transcoding Request 202 is obtained. If no unfulfilled operation request remains (exit "NO" from the step 802), the step 716 ends, otherwise (exit "YES") execution continues with the next step 804.

In the step 804 "Get Transcoding Object", a Transcoding Object 328, which matches the request is selected from the Transcoding Object Collection 326, which is capable of fulfilling the unfulfilled operation request. If the currently active builder is unable to fulfill the unfulfilled operation request with a Transcoding Object 328 (exit "NO" from the step 804), execution jumps to the step 808, otherwise (exit "YES") execution continues with the next step 806.

In the step 806 "Attach Transcoding Object to Pipeline", the Transcoding Object 328 found in the step 806 is attached as a matching Transcoding Operation 218 (i.e. matching the request) at the end of the current pipeline which may be the Main Pipeline 528, or a sub-pipeline when the step 716 is recursed. The unfulfilled operation request is now fulfilled with the matching Transcoding Operation 218.

In the step 808 "Create and Attach Sub-Pipeline", a new Sub-Pipeline 220 is created and attached at the end of the current pipeline. Note that the unfulfilled operation from the step 804 remains unfulfilled until the step 806 is eventually reached.

In the step 810 "Get Supporting Builder from Director", the currently active builder expands the current request into sub requests and, for each sub-request, asks the Director 306 to supply a supporting builder module that supports the sub-request. This mechanism is described in detail in the execution steps 702 to 714 of the Create Pipeline Plugin 520 (FIG. 7) in which the Correct Builder 718 was found.

In the step 812 "Recursively Execute Step 716, with Supporting Builder, Sub-Pipeline", the step 716 is recursively re-entered in which each of the supporting builders then fulfills the corresponding unfulfilled operations by appending a corresponding Transcoding Operation 218 to the sub-pipeline (the step 806) or possibly recurses again.

Figure 9:
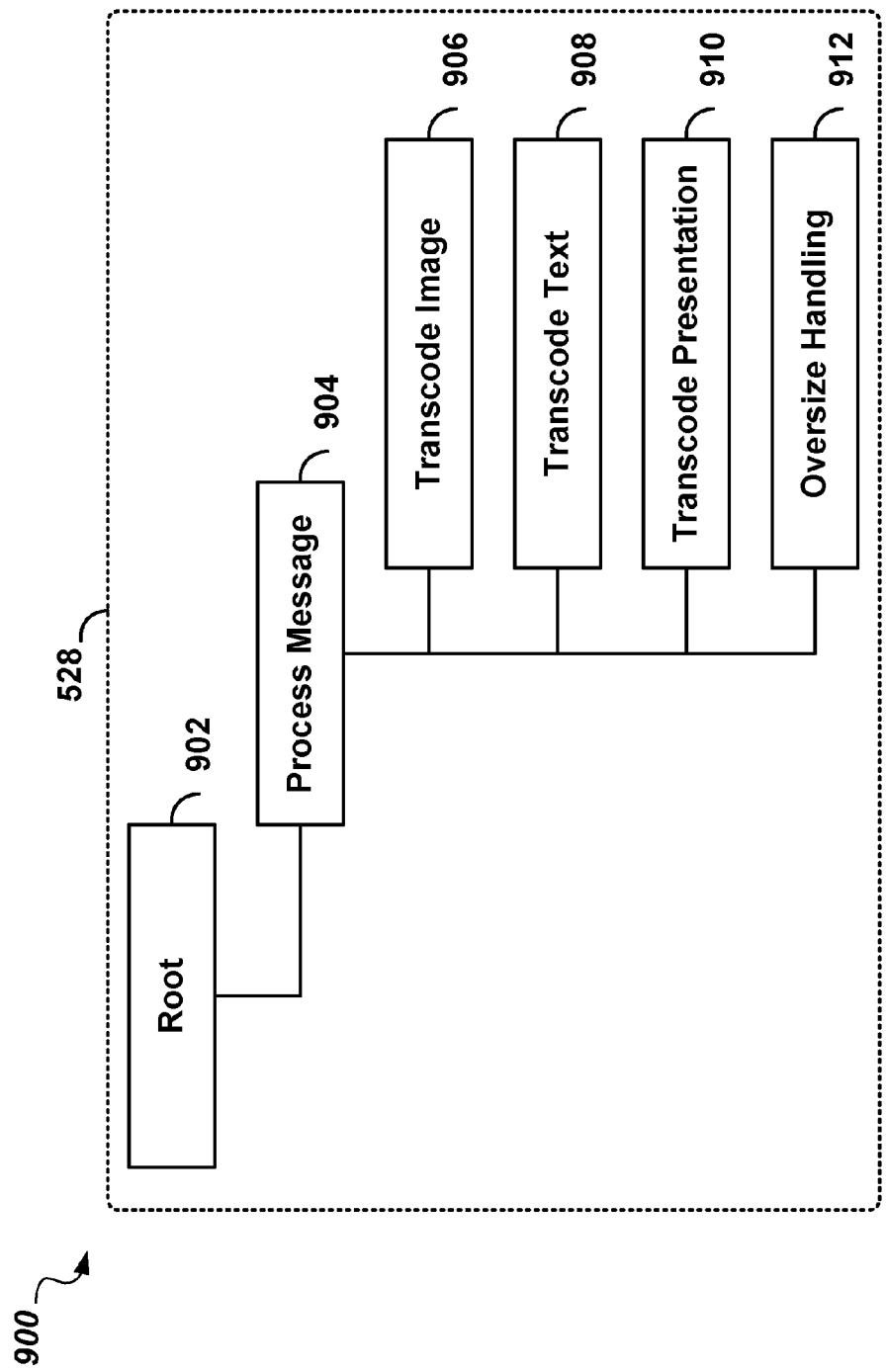
FIG. 9 shows a "Simple Message Pipeline" 900 which is an example instance of the Main Pipeline 528 that may have been created by the Create Pipeline Plugin 520 in the step 508 of FIG. 5.

FIG. 9 shows a "Simple Message Pipeline" 900 which is an example instance of the Main Pipeline 528 that may have been created by the Create Pipeline Plugin 520 in the step 508 (FIG. 5), including a Root 902 branching to a "Process Message" sub-pipeline 904 which is an instance of the Sub-Pipelines 220. The "Process Message" sub-pipeline 904 in turn includes branches to the following instances of the Transcoding Operations 218: a "Transcode Image Operation" 906; a "Transcode Text Operation" 908; a "Transcode Presentation Operation" 910; and an "Oversize Handling Operation" 912.

When the "Simple Message Pipeline" 900 is executed (see the step 716 of FIG. 7), each of the attached Transcoding Operations 218 performs independently the operation for which it is responsible:

the "Transcode Image Operation" 906 transcodes the image media that is included in the Input Media 212 according to the Destination Profile 214;

the "Transcode Text Operation" 908 transcodes the text media that is included in the Input Media 212 according to the Destination Profile 214;

the "Transcode Presentation Operation" 910 converts the presentation that is included in the Input Media 212 according to the Destination Profile 214; and the "Oversize Handling Operation" 912 ensures that the size of the final output media (the Adapted Output Media 226 and the Filtered Output Media 224) respects the limits specified in the Destination Profile 214, for example ensure in the case of an output message, that the output message size does not exceed the maximum size limit given in the Destination Profile 214. In order to achieve this, the "Oversize Handling Operation" performs a configurable type of action which includes one of, truncation of media contained in the message, or removal of contained media until the target size is reached.

Typically, any of the "Transcode Image Operation" 906, "Transcode Text Operation" 908, and "Transcode Presentation Operation" 910, works on a single media. If a plurality M of media of the same type need to be transcoded, for example M images, then M Transcode Image Operations 906 would be attached to the Transcoding Pipeline. The same applies for any type of operation.

The reader's attention is now directed to return back to the next step of FIG. 5.

In the step 510 "Execute 'Optimize Plugin'", the Optimize Plugin 522 is executed in which the Main Pipeline 528 that was created in the previous step, is examined and whereby Transcoding Operations 218 may be reordered, combined, or even removed if they are unnecessary. The result of the step 510 is an optimized form of the Main Pipeline 528. It includes only the Transcoding Operations 218 necessary for transcoding the Input Media 212.

Figure 10:
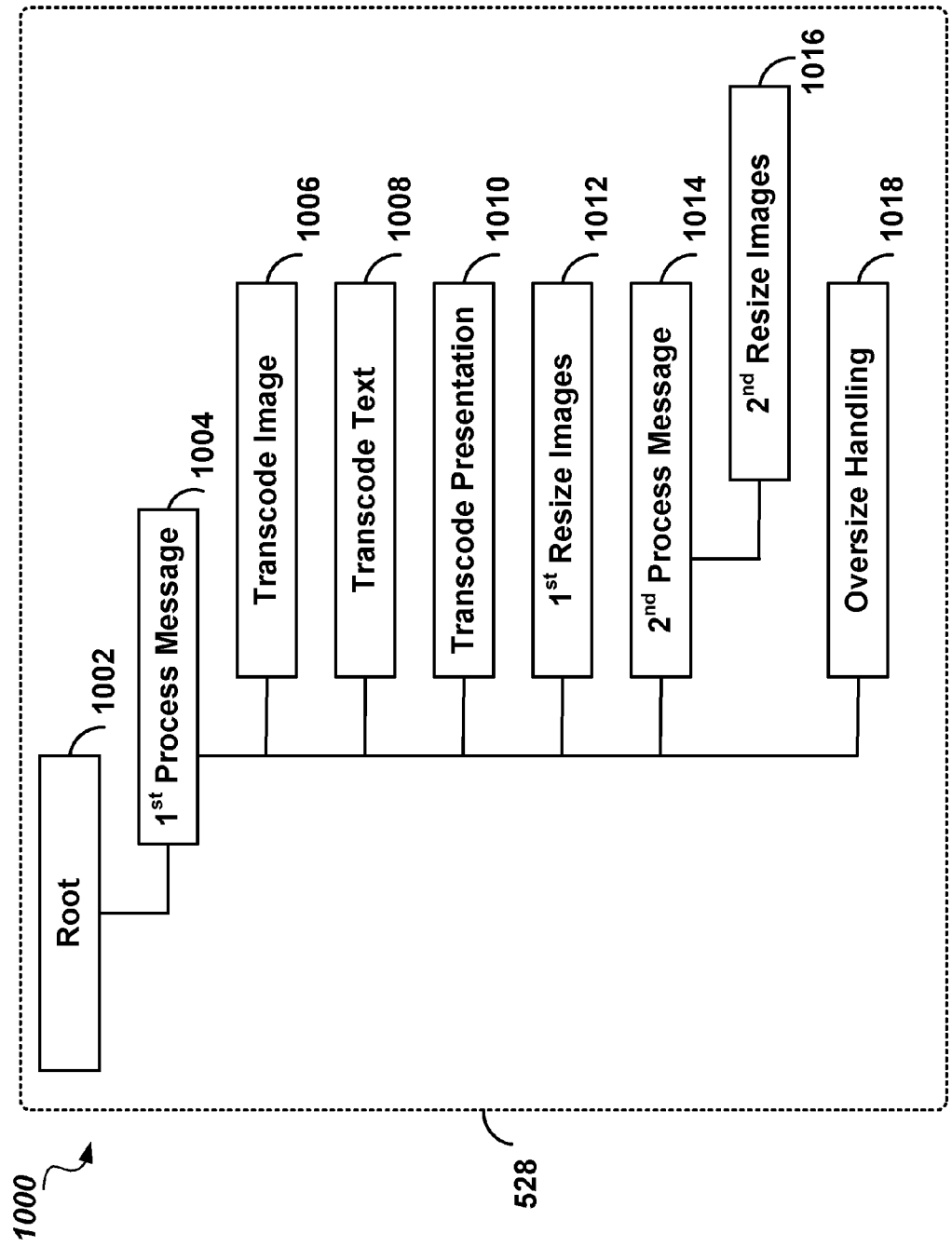
FIG. 10 shows an "Unoptimized Message Pipeline" 1000 which is another example instance of the Main Pipeline 528 that may have been created by the Create Pipeline Plugin 520 in the step 508 of FIG. 5.

FIG. 10 shows an "Unoptimized Message Pipeline" 1000 which is another example instance of the Main Pipeline 528 that may have been created by the Create Pipeline Plugin 520 in the step 508 (FIG. 5), including a Root 1002 branching to a first "Process Message" sub-pipeline 1004 which is an instance of the Sub-Pipelines 220. The first "Process Message" sub-pipeline 1004 in turn includes branches to the following instances of the Transcoding Operations 218: a "Transcode Image Operation" 1006; a "Transcode Text Operation" 1008; a "Transcode Presentation Operation" 1010; a first "Resize Images Operation" 1012; a second "Process Message" sub-pipeline 1014 which is another instance of the Sub-Pipelines 220 and branches to a single Transcoding Operation 218, namely a second "Resize Images Operation" 1016; and an "Oversize Handling Operation" 1018.

The "Unoptimized Message Pipeline" 1000 resembles the "Simple Message Pipeline" 900, but includes additional instances of the Transcoding Operations 218, namely the first and second "Resize Images Operations" 1012 and 1016 respectively, and an additional instance of the Sub-Pipelines 220, namely the second "Process Message" sub-pipeline 1014.

When the Optimize Plugin 522 module is executed with the "Unoptimized Message Pipeline" 1000, it will modify the pipeline to ensure that there is no sub-pipeline of the same type and merge the two sub-pipelines. Specifically, the first and second "Process Message" sub-pipelines 1004 and 1014 are of the same type ("Process Message") and are merged, that is the second "Process Message" sub-pipeline 1014 is eliminated and its become branches of the first "Process Message" sub-pipeline 1004. In addition, the Optimize Plugin 522 may also check if there are duplicate Transcoding Operations 218 of the same type, and eliminate one of them. In the case of the "Unoptimized Message Pipeline" 1000, the second "Resize Images Operation" 1016 is redundant and may be eliminated.

Figure 11:
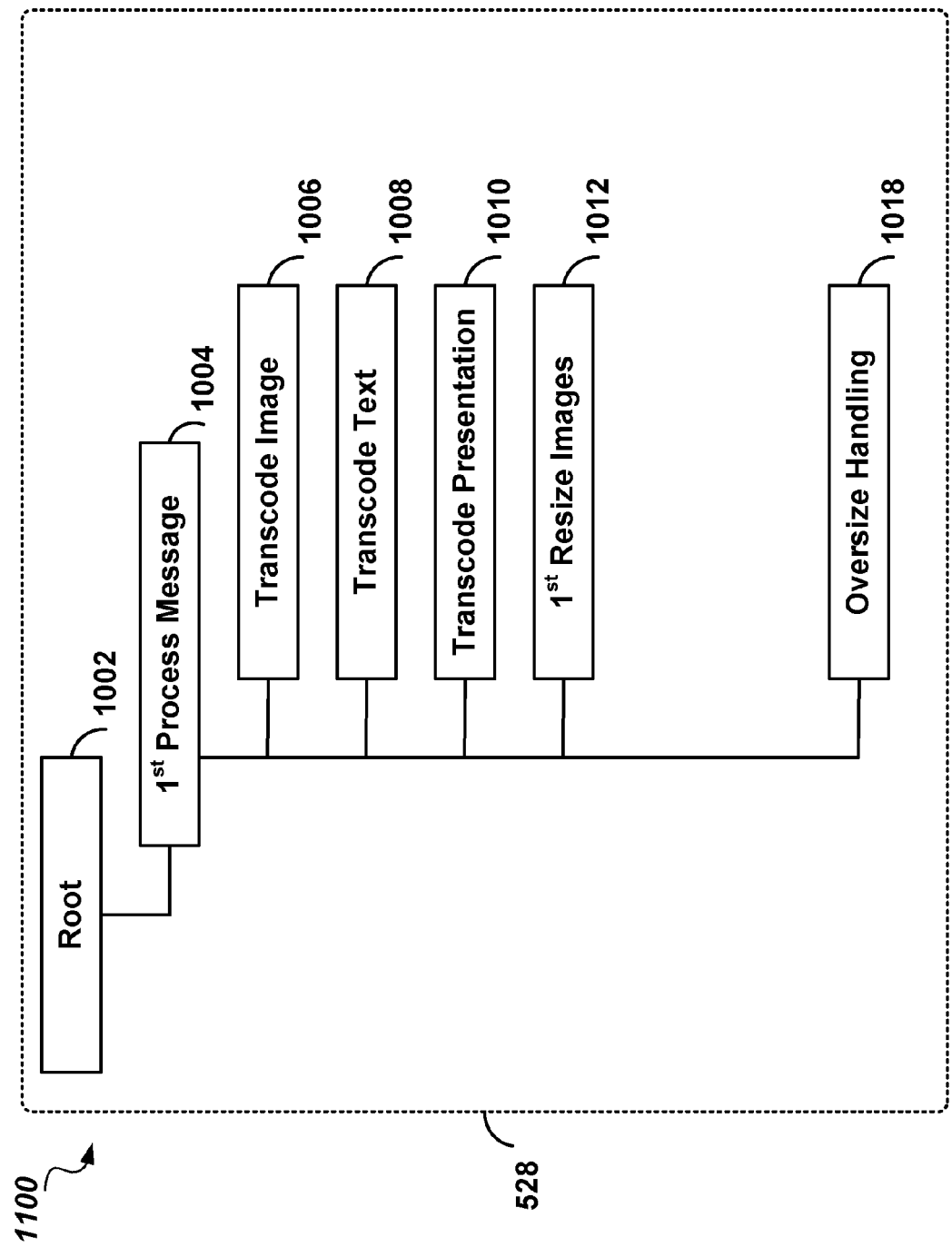
FIG. 11 shows an "Optimized Message Pipeline" 1100 that may result from optimizing the example "Unoptimized Message Pipeline" 1000 by the Optimize Plugin 522 in the step 510 of FIG. 5.

FIG. 11 shows an "Optimized Message Pipeline" 1100 that may result from optimizing the example "Unoptimized Message Pipeline" 1000 by the Optimize Plugin 522 in the step 510 (FIG. 5). The "Optimized Message Pipeline" 1100 comprises the Root 1002 branching to the first "Process Message" sub-pipeline 1004. The first "Process Message" sub-pipeline 1004 in turn includes branches to the following instances of the Transcoding Operations 218: the "Transcode Image Operation" 1006; the "Transcode Text Operation" 1008; the "Transcode Presentation Operation" 1010; the first "Resize Images Operation" 1012; and an "Oversize Handling Operation" 1018.

In this example, the resulting "Optimized Message Pipeline" 1100 has been optimized from the "Unoptimized Message Pipeline" 1000 effectively by the removal of all redundant Sub-Pipelines 220 and Transcoding Operations 218, i.e. the second "Process Message" sub-pipeline 1014 and the second "Resize Images Operation" 1016. All other elements remain unchanged. The Main Pipeline 528 is now ready for execution in the next step 512.

The reader's attention is now directed to return back to the next step of FIG. 5.

In the step 512 "Execute 'Execute Pipeline Plugin'", the Execute Pipeline Plugin 524 is executed in which each of the Transcoding Operations 218, including the Transcoding Operations 218 of the sub-pipelines, of the Main Pipeline 528 are sequentially processed.

Figure 12:
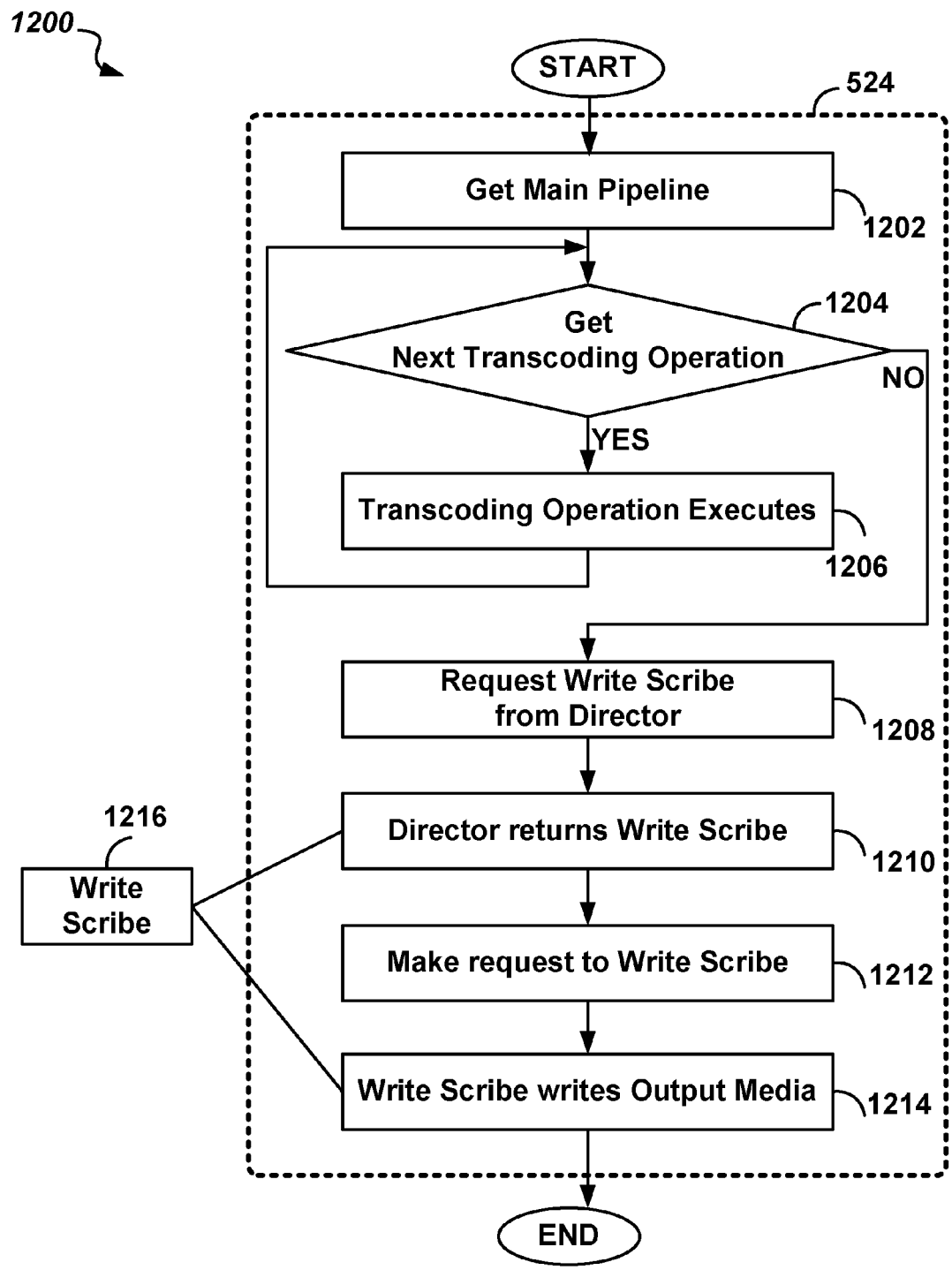
FIG. 12 shows a flowchart of an expansion of the step 512 "Execute 'Execute Pipeline Plugin'", of the Execute Pipeline Plugin 524 of FIG. 5.

FIG. 12 shows a flowchart of an expansion of the step 512 "Execute 'Execute Pipeline Plugin'", specifically of the execution of the Execute Pipeline Plugin 524 which comprises steps:

1202 "Get Main Pipeline";
1204 "Get Next Transcoding Operation";
1206 "Transcoding Operation Executes";
1208 "Request Write Scribe from Director";
1210 "Director returns Write Scribe";
1212 "Make request to Write Scribe"; and
1214 "Write Scribe writes Output Media".

In the step 1202 "Get Main Pipeline", the Execute Pipeline Plugin 524 transfers execution to the Main Pipeline 528 that is a software object including all attached Transcoding Operations 218 and Sub-Pipelines 220 in the form of a tree.

In the step 1204 "Get Next Transcoding Operation", the next item in the Main Pipeline 528 is found. If the next item is a Transcoding Operation (218), execution is transferred to this Transcoding Operation (exit "YES" from the step 1204) and execution continues with the next step 1206. If the next item is a sub-pipeline execution is transferred to the first Transcoding Operation 218 of this sub-pipeline, and so on. When the Main Pipeline 528 is exhausted, and all Transcoding Operations (218) of it, and of all sub-pipelines have been traversed, execution continues with the step 1208 (exit "NO" from the step 1206.

In the step 1206 "Transcoding Operation Executes", the Transcoding Operation 218 found in the previous step executes. The steps 1204 and 1206 form a loop which traverses the tree of the Main Pipeline 528 in a depth first order, thus executing all Transcoding Operation 218 of the Main Pipeline 528 and those of each of the sub-pipelines which may themselves include second and higher level sub-pipelines.

Each of the Transcoding Operations 218 of the Main Pipeline 528 and its sub-pipelines is a self contained Transcoding Object 328 that is able to execute operations on one or more parts of the Input Document 526 (which includes the media components of the Input Media 212), and fulfill the Transcoding Request 202 by generating the Output Document 530. Execution of the Transcoding Operations 218 of the Main Pipeline 528 may also generate the Transcoding Result 228.

In the step 1208 "Request Write Scribe from Director", the Execute Pipeline Plugin 524 calls the Director 306 with a "write query" to find a scribe able to write the Adapted Output Media 226 from the Output Document 530. In a sequence of steps analogous to the steps 604 to 610 (FIG. 6) described in detail for the "read" case, the Director 306 then queries each scribe and asks it if it can support the "write" operation. Each of the scribes examines the document type and answers 'true' if they can support it.

In the step 1210 "Director returns Write Scribe", when the director finds one of the scribes that can handle the write request it return it as a Write Scribe 1216 (also referred to as a write scribe module) to the 'Execute Pipeline' plugin 524.

In the step 1212 "Make request to Write Scribe", the 'Execute Pipeline Plugin' calls an Execute method on the Write Scribe 1216.

In the step 1214 "Write Scribe writes Output Media", the Write Scribe 1216 converts the Output Document 530 to the Adapted Output Media 226 of the Transcoder Output Dataset 206 in the format implied in the Destination Profile 214, which in combination with the Filtered Output Media 224 (if any) constitutes the Adapted Message 232.

The reader's attention is now directed to return back to the next step of FIG. 5.

In the step 514 "Execute 'Characterize Plugin'", the Characterize Plugin 534 is executed, in which the Characterization Result 230 of the Transcoder Output Dataset 206 is created which contains information about the properties of the Output Document 530 for example, size and number of media, the resolution in the case of video or image media etc., as well as a report of the Transcoding Result 228. This characterization step 514 is mainly intended for the collection of data about the performance of the system and may be omitted in the interest of the speed of transcoding.

As mentioned above, characterization of a document may also include characterization of the media that it contains. Additionally, the Characterize Plugin may be configured to also characterize the input media that take part in the transcoding.

In the step 516 "Execute 'Unsetup Session'", temporary files such as the Input Document 526, the Main Pipeline 528, and the Output Document 530 are deleted. Other resources used by the selected Plugin Program 324 (the Transcode Program 502 in the example) are also freed before execution returns to the Control Program 304.

Thus, a modular transcoder software system and corresponding methods for transcoding a multimedia message, including a collection of software modules and objects for the dynamic construction of a series of complex, related or unrelated operations in the form of a transcoding pipeline, has been provided. The transcoding pipeline provides a hierarchy of operations, such that they can be organized and optimized with the aim of being able to execute the entire hierarchy in a single pass. Additionally, external plugins can customize the mechanism of building the pipeline by altering, adding to, or removing construction knowledge.

The system and methods of the embodiments of the present invention provide for a flexible adaptation system that is scalable and provides increased performance and maintainability.

While the embodiments of the invention are described with reference to the adaptation of elements of multimedia messages, other similar applications may also benefit from the techniques described here.

Although the embodiments of the invention has been described in detail, it will be apparent to one skilled in the art that variations and modifications to the embodiment may be made within the scope of the following claims.

What is claimed is:

1. A transcoder system, comprising:
   a hardware processor;
   a non-transitory computer readable storage medium, comprising computer readable instructions stored thereon for execution by the hardware processor, for transcoding a multimedia message comprising individual media components of at least two types, into an adapted multimedia message, the computer readable instructions causing the hardware processor to:
   (a) receive a transcoding request, including the multimedia message and a destination profile describing characteristics of the adapted multimedia message to be sent to a destination device;
   (b) by a director module, dynamically select at run time only necessary builder modules from a predetermined set of builder modules, for building a transcoding pipeline module, which is specific for transcoding of the at least two different types of the individual media components of the multimedia message according to the destination profile; and
   (c) by the selected necessary builder modules, dynamically build at the run time the transcoding pipeline module, comprising only necessary transcoding operations modules from a predetermined set of transcoding operations modules, comprising an ordered arrangement of only necessary transcoding operations that are specific for the transcoding of the at least two different types of the individual media components.

2. The transcoder system of claim 1, wherein the computer readable instructions further cause the hardware processor to execute the transcoding operations of the transcoding pipeline module to generate the adapted multimedia message.

3. The transcoder system of claim 1, wherein the computer readable instructions further cause the hardware processor to:
   (d) by the director module, dynamically select at the run time a sub-set of builder modules from a predetermined set of builder modules, for building a transcoding sub-pipeline module, for performing those transcoding operations that are unfulfilled by the transcoding pipeline module; and
   (e) by said sub-set of builder modules, dynamically build at the run time the transcoding sub-pipeline module, comprising only necessary transcoding operations modules from the predetermined set of the transcoding operations modules, comprising only necessary transcoding operations that are unfulfilled by the transcoding pipeline module.

4. The transcoder system of claim 1, wherein the computer readable instructions further cause the hardware processor to perform operations of the builder modules recursively.

5. The transcoder system of claim 1, wherein the computer readable instructions further cause the hardware processor to generate sub-requests by the builder modules, to be handled by other builder modules.

6. The transcoder system of claim 1, wherein the computer readable instructions further cause the hardware processor to query the director module to find additional builder modules for generating one or more instances of the transcoding pipeline module, for each individual media component.

7. The transcoder system of claim 1, wherein the computer readable instructions further cause the hardware processor to remove redundant transcoding operations from the transcoding pipeline module.

8. The transcoder system of claim 1, wherein:
the transcoding pipeline module further comprises one or more scribe modules for formatting the adapted multimedia message; and
the director module is configured to find a scribe module having a capability of formatting the adapted multimedia message according to the destination profile.

9. The transcoder system of claim 8, wherein each of the one or more scribe modules is adapted for one of reading, decoding, encoding, scaling, or writing of the multimedia message, and the adapted multimedia message is adapted as respective one or more input documents and one or more output documents in a document format.

10. The transcoder system of claim 9, further comprising computer readable instructions causing the hardware processor to convert one document into another.

11. The transcoder system of claim 9, wherein a document has a structure, which is suitable for processing by the transcoding pipeline module, and is different from a structure of the multimedia message and the adapted multimedia message.

12. The transcoder system of claim 1, wherein:
each of said necessary builder modules comprises a builder query function module, indicating a capability of the builder module; and
the director module further comprises a builder selection module communicating with builder query function modules for determining respective capabilities of said necessary builder modules and matching the capabilities with information in the transcoding request.

13. The transcoder system of claim 1, wherein the transcoding pipeline module comprises an ordered list or a tree of transcoding operations.

14. The transcoder system of claim 1, wherein the multimedia message is a Multimedia Messaging Service (MMS) message.

15. A method for transcoding a multimedia message comprising individual media components of at least two types, into an adapted multimedia message, the method comprising:
(a) receiving a transcoding request, including the multimedia message and a destination profile describing characteristics of the adapted multimedia message to be sent to a destination device;
(b) by a director module, dynamically selecting at run time only necessary builder modules from a predetermined set of builder modules, for building a transcoding pipeline module, which is specific for transcoding of the at least two different types of the individual media components of the multimedia message according to the destination profile; and
(c) by the selected necessary builder modules, dynamically building at the run time the transcoding pipeline module, comprising only necessary transcoding operations modules from a predetermined set of transcoding operations modules, comprising an ordered arrangement of only necessary transcoding operations that are specific for the transcoding of the at least two different types of the individual media components.

16. The method of claim 15, further comprising executing the transcoding operations of the transcoding pipeline module to generate the adapted multimedia message.

17. The method of claim 15, further comprising:
(d) by the director module, dynamically selecting at the run time a sub-set of builder modules from a predetermined set of builder modules, for building a transcoding sub-pipeline module, for performing those transcoding operations that are unfulfilled by the transcoding pipeline module; and
(e) by said sub-set of builder modules, dynamically building at the run time the transcoding sub-pipeline module, comprising only necessary transcoding operations modules from the predetermined set of the transcoding operations modules, comprising only necessary transcoding operations that are unfulfilled by the transcoding pipeline module.

18. The method of claim 15, further comprising performing operations of the builder modules recursively.

19. The method of claim 15, further comprising generating sub-requests by the builder modules, to be handled by other builder modules.

20. The method of claim 15, further comprising querying the director module to find additional builder modules for generating one or more instances of the transcoding pipeline module, for each individual media component.

21. The method of claim 15, further comprising removing redundant transcoding operations from the transcoding pipeline module.

22. The method of claim 15, further comprising:
by one or more scribe modules within the transcoding pipeline module, formatting the adapted multimedia message; and
by the director module, finding a scribe module having a capability of formatting the adapted multimedia message according to the destination profile.

23. The method of claim 22, further comprising:
by each of the one or more scribe modules, reading, decoding, encoding, scaling, or writing the multimedia message, and adapting the adapted multimedia message as respective one or more input documents and one or more output documents in a document format.

24. The method of claim 23, further comprising converting one document into another.

25. The method of claim 23, wherein the adapting comprises adapting as a document having a structure, which is suitable for processing by the transcoding pipeline module, and is different from a structure of the multimedia message and the adapted multimedia message.

26. The method of claim 15, further comprising:
by each of said necessary builder modules comprising a builder query function module, indicating a capability of the builder module; and
by a builder selection module within the director module, communicating with builder query function modules for determining respective capabilities of said necessary builder modules and matching the capabilities with information in the transcoding request.

27. The method of claim 15, wherein dynamically building the transcoding pipeline module comprises building an ordered list or a tree of transcoding operations.

28. The method of claim 15, wherein the multimedia message is a Multimedia Messaging Service (MMS) message.

\* \* \* \* \*

UNITED STATES PATENT AND TRADEMARK OFFICE
CERTIFICATE OF CORRECTION

PATENT NO. : 9,794,319 B2
APPLICATION NO. : 13/655384
DATED : October 17, 2017
INVENTOR(S) : Richard Norton et al.

It is certified that error appears in the above-identified patent and that said Letters Patent is hereby corrected as shown below:

On the Title Page

Item (72) Inventors, "Mario Joseph Leo Claude Lavalliere" is corrected to read as --Joseph Leo Claude Mario Lavalliere--

Signed and Sealed this
Fourteenth Day of August, 2018

Andrei Iancu
*Director of the United States Patent and Trademark Office*